United States Patent
Bae et al.

(10) Patent No.: US 12,294,411 B2
(45) Date of Patent: May 6, 2025

(54) OPTICAL CHANNEL-BASED ELECTRONIC SYSTEMS AND OPERATING METHODS THEREOF

(71) Applicant: SAMSUNG ELECTRONICS CO., LTD., Suwon-si (KR)

(72) Inventors: Hanyeoreum Bae, Suwon-si (KR); Myoungsoo Jung, Suwon-si (KR); Jie Zhang, Suwon-si (KR)

(73) Assignees: SAMSUNG ELECTRONICS CO., LTD. (KR); KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 239 days.

(21) Appl. No.: 18/200,145

(22) Filed: May 22, 2023

(65) Prior Publication Data

US 2024/0056191 A1    Feb. 15, 2024

(30) Foreign Application Priority Data

Aug. 12, 2022 (KR) .................. 10-2022-0101592
Oct. 26, 2022 (KR) .................. 10-2022-0139667

(51) Int. Cl.
*H04B 10/00* (2013.01)
*G02B 6/293* (2006.01)
(Continued)

(52) U.S. Cl.
CPC ....... *H04B 10/506* (2013.01); *G02B 6/29338* (2013.01)

(58) Field of Classification Search
CPC ..... H04B 10/27; H04B 10/278; H04B 10/801
See application file for complete search history.

(56) References Cited

U.S. PATENT DOCUMENTS 8,472,802 B2    6/2013   Ahn et al.
9,706,272 B2    7/2017   Dupas et al.
(Continued)

FOREIGN PATENT DOCUMENTS

KR    101739267 B1    5/2017

OTHER PUBLICATIONS

"Hyesoon Kim, Jaekyu Lee, Nagesh B Lakshminarayana, Jaewoong Sim, Jieun Lim, and Tri Pho. 2012. Macsim: A cpu-gpu heterogeneous simulation framework user guide. Georgia Institute of Technology (2012)."
(Continued)

*Primary Examiner* — Daniel G Dobson
(74) *Attorney, Agent, or Firm* — Myers Bigel, P.A.

(57) ABSTRACT

An electronic system for transmitting and receiving internal data through an optical channel. The electronic system may include a light emitter configured to generate a first optical signal, a first device configured to receive the first optical signal and including a transmitter configured to output a second optical signal representing a transmission value based on the first optical signal, a second device including a first receiver configured to receive the second optical signal from the first device and output a third optical signal by adjusting a light intensity of the second optical signal, and configured to read the transmission value based on the light intensity of the second optical signal, and a third device including a second receiver configured to receive the third optical signal from the second device, and configured to read the transmission value based on a light intensity of the third optical signal.

20 Claims, 20 Drawing Sheets

(51) Int. Cl.
*H04B 10/50* (2013.01)
*H04J 14/00* (2006.01)

(56) References Cited

U.S. PATENT DOCUMENTS

| | | | |
|---|---|---|---|
| 9,739,939 B1 | 8/2017 | Quinlan | |
| 10,536,237 B2 | 1/2020 | Taguchi et al. | |
| 11,233,578 B2 | 1/2022 | Gomez | |
| 11,323,787 B1 | 5/2022 | Leigh et al. | |
| 2011/0097086 A1* | 4/2011 | Binkert | G02B 6/12007 398/71 |
| 2013/0251378 A1* | 9/2013 | Ahn | H04B 10/2507 398/141 |
| 2015/0163570 A1* | 6/2015 | Zid | H04B 10/278 398/45 |
| 2017/0336586 A1* | 11/2017 | Vaidyanathan | G02B 6/4246 |
| 2019/0058306 A1 | 2/2019 | Wen et al. | |

OTHER PUBLICATIONS

"Ohm-GPU: Integrating New Optical Network and Heterogeneous Memory into GPU Multi-Processors" Oct. 17, 2021.

"Ronald L Rivest, Adi Shamir. "How to reuse a write-once? memory." In Information and control 55 (1-3), pp. 1-19. Academic Press, 1982."

"Zhongqi Li, Ruijin Zhou, and Tao Li. 2013. Exploring high-performance and energy proportional interface for phase change memory systems. In 2013 IEEE 19th International Symposium on High Performance Computer Architecture (HPCA). IEEE, 210-221."

* cited by examiner

FIG. 12

| data | SECOND OPTICAL SIGNAL | THIRD OPTICAL SIGNAL |
|---|---|---|
| 00 | 111 | 000 |
| 01 | 110 | $00\frac{1}{2}$ |
| 10 | 101 | $0\frac{1}{2}0$ |
| 11 | 011 | $\frac{1}{2}00$ |

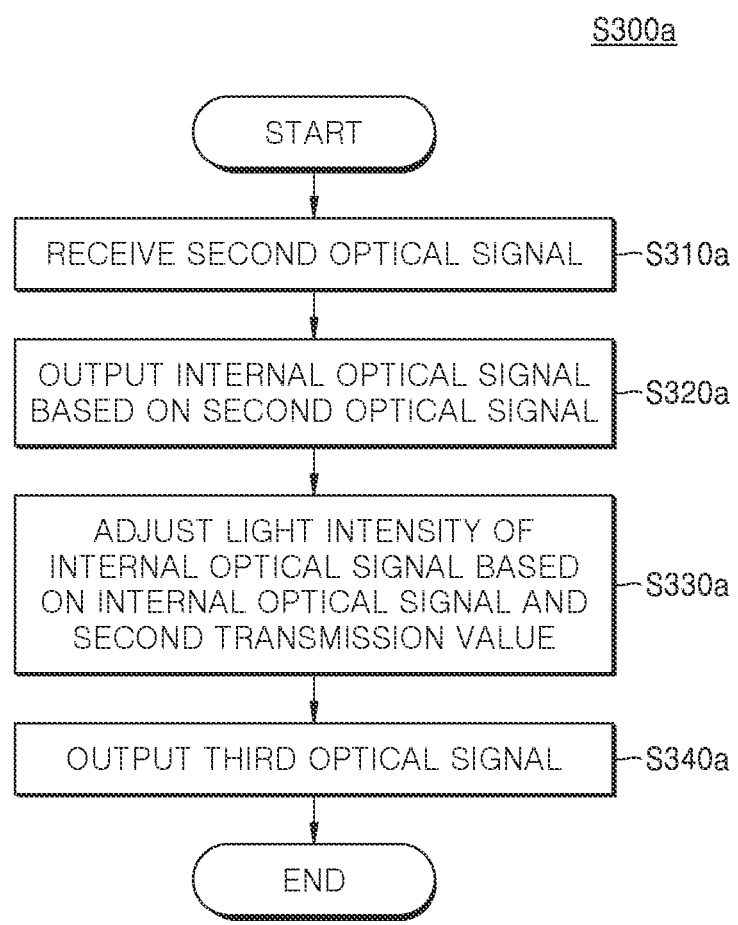

OPTICAL CHANNEL-BASED ELECTRONIC SYSTEMS AND OPERATING METHODS THEREOF

CROSS-REFERENCE TO RELATED APPLICATIONS

This application is based on and claims priority under 35 U.S.C. § 119 to Korean Patent Application Nos. 10-2022-0101592, filed on Aug. 12, 2022, and 10-2022-0139667, filed on Oct. 26, 2022, in the Korean Intellectual Property Office, and the entire contents of the above-identified applications are incorporated by reference herein.

TECHNICAL FIELD

The present disclosure relates to electronic systems and operating methods thereof that transmit data between various devices included in the electronic systems through an optical channel, and more particularly, to an electronic system capable of improving data transmission performance inside the electronic system by simultaneously transmitting the same data or different data between several devices included in the electronic system and operating methods thereof.

BACKGROUND

Data transfer between internal devices in an electronic system is mostly performed using electrical signal-based channels. Electrical signal-based channels may have limitations in terms of bandwidth and power consumption. Under consideration to solve performance and power consumption problems due to these limitations are methods and systems in which data may be transmitted through an optical network-based channel. Channels using an optical channel may transmit data with relatively low power while having a relatively high bandwidth.

SUMMARY

The present disclosure provides electronic systems and methods of improving data transmission performance thereof by transmitting data between devices inside the electronic system through an optical channel.

According to some aspects of the inventive concepts, there is provided an electronic system that is configured to transmit and receive internal data through an optical channel, the electronic system including a light emitter configured to generate a first optical signal, a first device configured to receive the first optical signal from the light emitter, the first device including a transmitter configured to output a second optical signal representing a transmission value based on the first optical signal, a second device including a first receiver configured to receive the second optical signal from the first device and output a third optical signal representing the transmission value by adjusting a light intensity of the second optical signal, the second device configured to read the transmission value based on the light intensity of the second optical signal, and a third device including a second receiver configured to receive the third optical signal from the second device, and configured to read the transmission value based on a light intensity of the third optical signal.

According to some aspects of the inventive concept, there is provided an electronic system that is configured to transmit and receive internal data through an optical channel, the electronic system including a light emitter configured to generate a first optical signal, a first device configured to receive the first optical signal from the light emitter, the first device including a first transmitter configured to output a second optical signal representing a first transmission value based on the first optical signal, a second device including a first receiver configured to receive the second optical signal from the first device and output an internal optical signal based on a light intensity of the second optical signal, the second device further comprising a second transmitter configured to receive the internal optical signal from the first receiver and output a third optical signal representing a second transmission value based on a light intensity of the internal optical signal, the second device configured to read the first transmission value based on the light intensity of the second optical signal, and a third device including a second receiver configured to receive the third optical signal from the second device, and configured to read the second transmission value based on a light intensity of the third optical signal.

According to some aspects of the inventive concepts, there is provided a method of operating an electronic system that includes a first device including a first transmitter, a second device including a first receiver, and a third device including a second receiver, where the first device, second device, and third device each coupled to an optical channel, the method including generating a first optical signal, receiving the first optical signal at a first transmitter and outputting a second optical signal from the first transmitter, the second optical signal based on the first optical signal and a first transmission value, receiving the second optical signal at a first receiver and outputting a third optical signal from the second device based on the second optical signal, reading first data based on the second optical signal by the second device, receiving the third optical signal at a second receiver, and reading second data based on the third optical signal by a third device.

BRIEF DESCRIPTION OF THE DRAWINGS

Aspects of the present disclosure will be more clearly understood from the following detailed description taken in conjunction with the accompanying drawings in which:

FIG. 12 is a table showing a mapping table utilized in WOM coding according to FIG. 11; and FIG. 13 is a flowchart illustrating a method of operating a system, according to some embodiments.

DETAILED DESCRIPTION OF THE EMBODIMENTS

Hereinafter, some embodiments of the inventive concept are described in detail with reference to the accompanying drawings.

Figure 1:
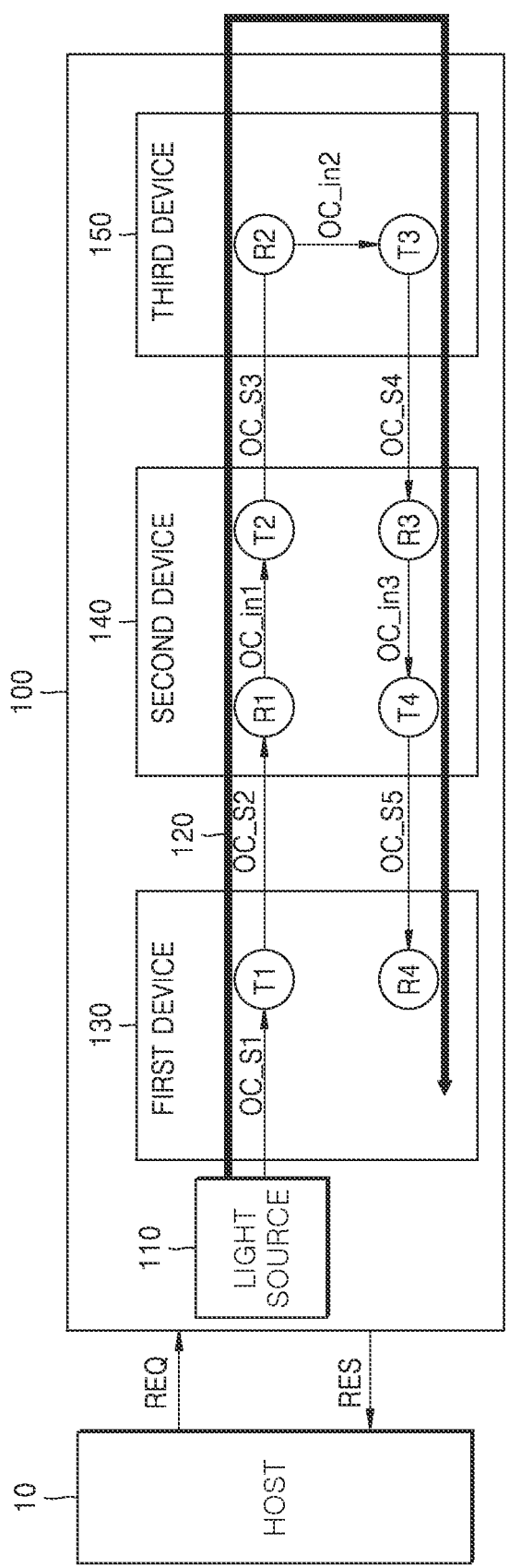
FIG. 1 is a block diagram illustrating a system according to some embodiments.

FIG. 1 is a block diagram illustrating a system 100 according to some embodiments.

The system 100 may refer to any system that includes a light source 110, an optical channel 120, a first device 130, a second device 140, and a third device 150. In some embodiments, the system 100 may be an electronic system. For example, the system 100 may be a memory system including a memory controller and a plurality of memory devices.

The system 100 may receive a request REQ from a host 10 and may provide a response RES corresponding to the request to the host 10. The host 10 may be referred to as a host processor. The host 10 may be a central processing unit (CPU). However, the host 10 is not limited thereto, and the host 10 may be implemented with various types of processors, such as graphics processors, microprocessors, multimedia processors, and application processors. In some embodiments, the host 10 may be implemented as an integrated circuit (IC) or system on chip (SoC).

In some embodiments, the first device 130 may be a memory controller, the second device 140 may be a first memory device, and the third device 150 may be a second memory device. The second device 140 and the third device 150 may be any hardware capable of storing information, accessible by the host, and operating under control by the first device 130, which in turn may operate based on a request and/or command of the host 10. For example, each of the second device 140 and the third device 150 may include read only memory (ROM), random-access memory (RAM), dynamic random access memory (DRAM), double-data-rate dynamic random access memory (DDR-DRAM), synchronous dynamic random access memory (SDRAM), and static random access memory (SRAM), magnetoresistive random access memory (MRAM), programmable read only memory (PROM), erasable programmable read only memory (EPROM), electrically erasable programmable read only memory (EEPROM), flash memory, polymer memory, phase change memory, ferroelectric memory, silicon-oxide-nitride-oxide-silicon (SONOS) memory, magnetic card/disk, and/or an optical card/disk, or a combination of two or more of these.

When data is to be transferred between the first device 130, the second device 140, and/or the third device 150, the system 100 may transfer data between devices through the optical channel 120. Accordingly, the first device 130, the second device 140, and the third device 150 may be or may include a transmitter for transmitting data and/or a receiver for receiving data in the process of exchanging data. Hereinafter, among the first device 130, the second device 140, and the third device 150 in the internal data transmission process of the system 100, a device that performs a data transmission operation (or an operation of transmitting data) may be referred to as a transmission device, and a device that performs a data reception operation (or an operation of receiving data) may be referred to as a receiver. A device that simultaneously transmits and receives data may be referred to as a transceiver. Data to be transmitted may be referred to as a transmission value.

The transfer of internal data between internal devices by the system 100 may be described in two modes. In some embodiments, the system 100 may operate in a first transmission mode in which one device operates as a transmitter and the other two devices operate as receivers.

For example, when the system 100 operates in the first transmission mode the first device 130 may operate as a transmitter and the second device 140 and the third device 150 may operate as receivers so that the first device 130 may transmit the same transmission value to the second device 140 and the third device 150.

As another example, when the system 100 operates in the first transmission mode the second device 140 may operate as a transmitter and the first device 130 and the third device 150 may operate as receivers so that the second device 140 may transmit the same transmission value to the first device 130 and the third device 150.

As another example, when the system 100 operates in the first transmission mode the third device 150 may operate as a transmitter and the first device 130 and the third device 150 may operate as receivers so that the third device 150 may transmit the same transmission value to the first device 130 and the second device 140.

In some embodiments, the system 100 may operate in a second transmission mode in which one device operates as a transmitter, another device operates as a transceiver, and the remaining devices operate as receivers.

For example, when the system 100 operates in the second transmission mode, the first device 130 operates as a transmitter, the second device 140 operates as a transceiver, and the third device 150 operates as a receiver, so that the first device 130 may transmit a first transmission value to the second device 140 and the second device 140 may transmit a second transmission value to the third device 150. The second transmission value may differ from the first transmission value.

As another example, when the system 100 operates in the second transmission mode, the first device 130 operates as a transmitter, the third device 150 operates as a transceiver, and the second device 140 operates as a receiver, so that the first device 130 may transmit a first transmission value to the third device 150 and the third device 150 may transmit a second transmission value to the second device 140. The second transmission value may differ from the first transmission value.

As another example, when the system 100 operates in the second transmission mode, the second device 140 operates as a transmitter, the third device 150 operates as a transceiver, and the first device 130 operates as a receiver, so that the second device 140 may transmit a first transmission value to the third device 150 and the third device 150 may transmit a second transmission value to the first device 130. The second transmission value may differ from the first transmission value.

As another example, when the system 100 operates in the second transmission mode, the third device 150 operates as a transmitter, the second device 140 operates as a transceiver, and the first device 130 operates as a receiver, so that the third device 150 may transmit a first transmission value to the second device 140 and the second device 140 may transmit a second transmission value to the first device 130. The second transmission value may differ from the first transmission value.

The first device 130, the second device 140, and the third device 150 may each include at least one transmitter and at least one receiver. The transmitters of the first device 130, the second device 140, and the third device 150 may receive an optical signal through the optical channel 120 and may output an encoded optical signal by encoding an optical signal based on the received optical signal and a transmission value to be transmitted. In the case of not transmitting data, (e.g., if data is not to be transmitted) the transmitter may be deactivated and thus encoding of the optical signal may not be performed. Therefore, the optical signal received by the transmitter and the optical signal output from the transmitter may be the same optical signal.

Hereinafter, activation of the transmitter or receiver may mean that the transmitter or receiver may perform an operation of absorbing all or part (e.g., a portion) of the received optical signal and adjusting the light intensity of the optical signal. An activated transmitter may be referred to as an active transmitter, and an activated receiver may be referred to as an active receiver.

Hereinafter, deactivation of the transmitter or receiver may mean that the transmitter or receiver does not absorb the received optical signal, thereby outputting an optical signal having the same light intensity as the received optical signal.

Hereinafter, encoding of the optical signal may mean that the first device 130, the second device 140, or the third device 150 adjusts the intensity of light to be output from the active transmitter by controlling the active transmitter based on a transmission value to be transmitted and an optical signal received by the active transmitter.

Hereinafter, decoding of the optical signal may mean that the first device 130, the second device 140, or the third device 150 reads a transmission value based on the light intensity of the optical signal received through the active receiver.

The receivers of the first device 130, the second device 140, and the third device 150 may receive an optical signal through the optical channel 120 and may output an optical signal by adjusting the light intensity of the received optical signal again. The first device 130, the second device 140, and the third device 150 may read data by decoding the optical signal based on the light intensity of the optical signal received by the receiver. When data is not received, the receiver may be deactivated, and therefore, an optical signal received by the receiver and an optical signal output from the receiver may be the same optical signal.

Transmitters and receivers included in the first device 130, the second device 140, and the third device 150 may include a micro ring resonator (MRR). The MRR is described below in detail with reference to FIGS. 2A to 2C.

The light source 110 may be configured to generate a first optical signal OC_S1 that is light having a first wavelength. The light source 110 may be referred to as a light emitter. Hereinafter, the relative light intensity of optical signals may be divided into four reference values and explained. For example, that the light intensity of the optical signal is the first reference value may mean that the optical signal has the light intensity immediately after being generated by the light source 110. That the light intensity of the optical signal is the second reference value may mean that the light intensity of the optical signal has half the light intensity of the first reference value. That the light intensity of the optical signal is the third reference value may mean that the light intensity of the optical signal has half the light intensity of the second reference value (e.g., one-quarter the light intensity of the first reference value). That the light intensity of the optical signal is the fourth reference value may mean that the light intensity of the optical signal is very weak or zero. Accordingly, when all or half of the light of the optical signal having the fourth reference value is absorbed, the light intensity of the output optical signal based on this light intensity may be unchanged and the same as the fourth reference value.

The optical channel 120 may include a waveguide. Light generated by the light source 110 may be referred to as an optical signal. Optical signals may be transferred to the first device 130, the second device 140, and the third device 150 through the waveguide of the optical channel 120.

The first device 130 may include a first transmitter T1 and a fourth receiver R4. The first device 130 may receive the first optical signal OC_S1 from the light source 110 through the first transmitter T1 and output a second optical signal OC_S2. The first device 130 may receive a fifth optical signal OC_S5 from the fourth transmitter T4 of the second device 140 through the fourth receiver R4.

The first transmitter T1 may be activated when the first device 130 transmits data to the second device 140 and/or the third device 150. The fourth receiver R4 may be activated when the first device 130 receives data from the second device 140 or the third device 150.

The second device 140 may include a first receiver R1, a second transmitter T2, a third receiver R3, and a fourth transmitter T4. The first receiver R1 may receive the second optical signal OC_S2 from the first transmitter T1 of the first device 130 and may output a first internal optical signal OC_in1. The second transmitter T2 may receive the first internal optical signal OC_in1 from the first receiver R1 and output a third optical signal OC_S3. The third receiver R3 may receive a fourth optical signal OC_S4 from the third transmitter T3 of the third device 150 and output a third internal optical signal OC_in3. The fourth transmitter T4 may receive the third internal optical signal OC_in3 from the third receiver R3 and output a fifth optical signal OC_S5.

The second transmitter T2 may be activated when the second device 140 transmits data to the first device 130 or the third device 150. The fourth transmitter T4 may be activated when the second device 140 transmits data to the first device 130. The first receiver R1 may be activated when the second device 140 receives data from the first device 130. The third receiver R3 may be activated when the second device 140 receives data from the third device 150.

The third device 150 may include a second receiver R2 and a third transmitter T3. The second receiver R2 may receive the third optical signal OC_S3 from the second transmitter T2 of the second device 140 and output a second internal optical signal OC_in2. The third transmitter T3 may receive the second internal optical signal OC_in2 from the second receiver R2 and may output a fourth optical signal CO S4.

The second receiver R2 may be activated when the third device 150 receives data from the first device 130 or the second device 140. The third transmitter T3 may be activated when the third device 150 transmits data to the first device 130 or the second device 140.

As shown in FIG. 1, the optical channel 120 may sequentially transmit optical signals to the first transmitter T1 of the first device 130, the first receiver R1 of the second device 140, the second transmitter T2 of the second device 140, the second receiver R2 of the third device 150, the third transmitter T3 of the third device 150, the third receiver R3 of the second device 140, the fourth transmitter T4 of the second device 140, and the fourth receiver R4 of the first device 130 through the waveguide. Whenever the optical signal passes through each transmitter or receiver of the first device 130, the second device 140, or the third device 150, the light intensity of the optical signal may be maintained or reduced.

In some embodiments, the first optical signal OC_S1, the second optical signal OC_S2, the third optical signal OC_S3, the fourth optical signal OC_S4, the fifth optical signal OC_S5, the first internal optical signal OC_in1, the second internal optical signal OC_in2, and the third internal optical signal OC_in3 may be transmitted through the optical channel 120.

Figure 2A:
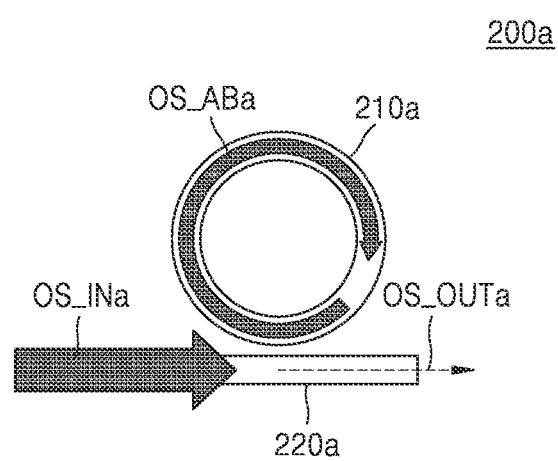
FIGS. 2A, 2B, and 2C are diagrams illustrating a transmitter and a receiver according to some embodiments.
Figure 2B:
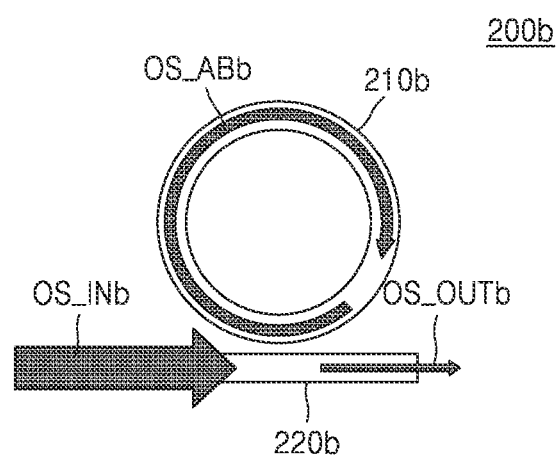
Figure 2C:
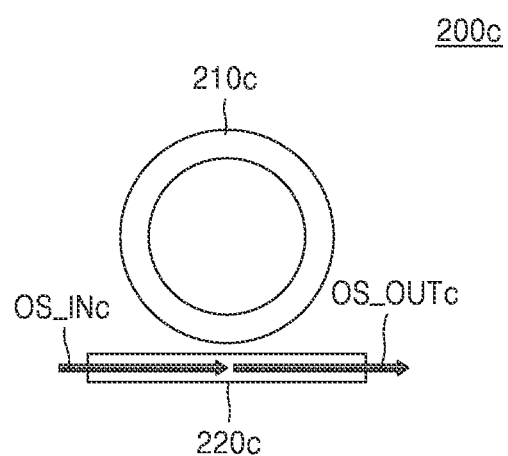

FIGS. 2A to 2C are diagrams illustrating a transmitter and a receiver according to some embodiments. In greater detail, FIGS. 2A to 2C show transmitters or receivers 200a, 200b and 200c included in the first device 130, the second device 140, and the third device 150 of the system 100. FIGS. 2A to 2C may be described with reference to FIG. 1, and descriptions already given may be omitted.

The transmitters or receivers 200a, 200b, and 200c may include optical channels 220a, 220b, and 220c and MRRs 210a, 210b, and 210c. The optical channels 220a, 220b, and 220c shown in FIGS. 2A to 2C may correspond to a portion of the waveguide included in the optical channel 120 of FIG. 1.

The MRRs 210a, 210b, and 210c may be configured to absorb light of a specific wavelength and output remaining unabsorbed light. Hereinafter, it is assumed that the wavelengths of input optical signals OS_INa, OS_INb, and OS_INc are a first wavelength.

Referring to FIG. 2A, it is shown that the transmitters or receivers 200a, 200b, and 200c may operate in a first mode. The MRR 210a operating in the first mode may be referred to as a fully coupled micro ring resonator (FCMRR). When the transmitters or receivers 200a, 200b, and 200c operate in the first mode, the MRR 210a may be configured to absorb all light of the first wavelength, which is the wavelength of the input optical signal OS_INa. Accordingly, most of the light of the input optical signal OS_INa may be absorbed by the MRR 210a. An output optical signal OS_OUTa may represent remaining optical signals excluding the optical signal OS_ABa absorbed from the input optical signal OS_INa. In this case, the light intensity of the output optical signal OS_INa is greatly reduced compared to the input optical signal OS_INa or the absorbed optical signal OS_ABa, so that the light intensity of the output optical signal OS_INa may be very weak.

In some embodiments, when a transmitter or receiver is operating in the first mode and the light intensity of the input optical signal OS_INa is a first reference value, a second reference value, or a third reference value, the light intensity of the output optical signal OS_OUTa may be a fourth reference value.

Referring to FIG. 2B, it is shown that the transmitters or receivers 200a, 200b, and 200c may operate in a second mode. The MRR 210b operating in the second mode may be referred to as a half coupled micro ring resonator (HCMRR). When the transmitters or receivers 200a, 200b, and 200c operate in the second mode, the MRR 210b may be configured to absorb only half of light of the first wavelength, which is the wavelength of the input optical signal OS_INb. An output optical signal OS_OUTb may have the light intensity of the remaining optical signals excluding the optical signal OS_ABb absorbed from the input optical signal OS_INb. In this case, the light intensity of the output optical signal OS_INb may have a light intensity corresponding to half of the light intensity of the input optical signal OS_INb.

In some embodiments, when a transmitter or receiver is operating in the second mode and the light intensity of the input optical signal OS_INb is a first reference value, the light intensity of the output optical signal OS_OUTb may be a second reference value. In some embodiments, when a transmitter or receiver is operating in the second mode and the light intensity of the input optical signal OS_INb is the second reference value, the light intensity of the output optical signal OS_OUTb may be the third reference value.

Referring to FIG. 2C, it is shown that the transmitters or receivers 200a, 200b, and 200c may operate in a third mode. The MRR 210c operating in the third mode may be referred to as Not Coupled MRR, and the MRR 210c may be referred to as OFF. When the transmitters or receivers 200a, 200b, and 200c operate in the third mode, the MRR 210c may be configured not to absorb light of the first wavelength, which is the wavelength of the input optical signal OS_INb. Accordingly, the light intensity of the input optical signal OS_INc may be equal to the light intensity of the output optical signal OS_OUTc.

In some embodiments, when the transmitters or receivers 200a, 200b, or 200c are in an inactive state, the transmitters or receivers 200a, 200b, or 200c may operate in the third mode.

In some embodiments, when the transmitter or receiver 200a, 200b, or 200c should not absorb the received optical signal, the transmitters or receivers 200a, 200b, or 200c may operate in the third mode.

In some embodiments, when the transmitters or receivers 200a, 200b, or 200c should not absorb an optical signal received while operating in the first mode or the second mode, the transmitters or receivers 200a, 200b, or 200c may not absorb the received optical signal by operating in the third mode for a certain period of time.

Figure 3A:
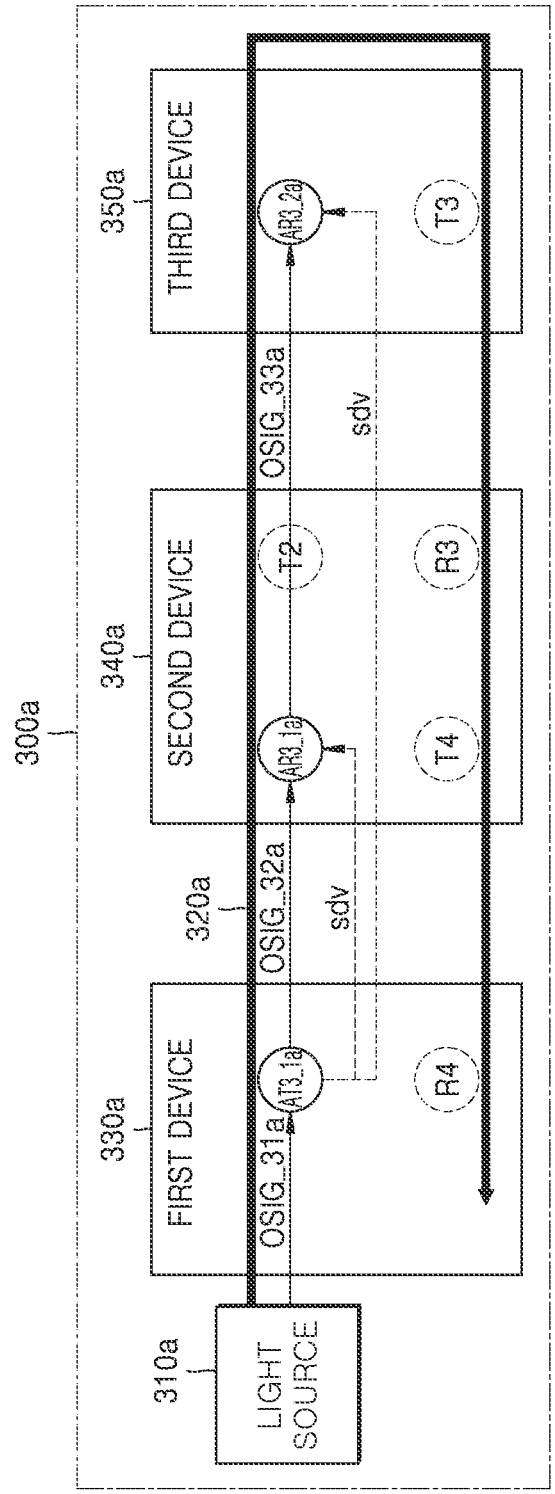
FIGS. 3A, 3B, and 3C are block diagrams to explain operation of a first transmission mode.
Figure 3B:
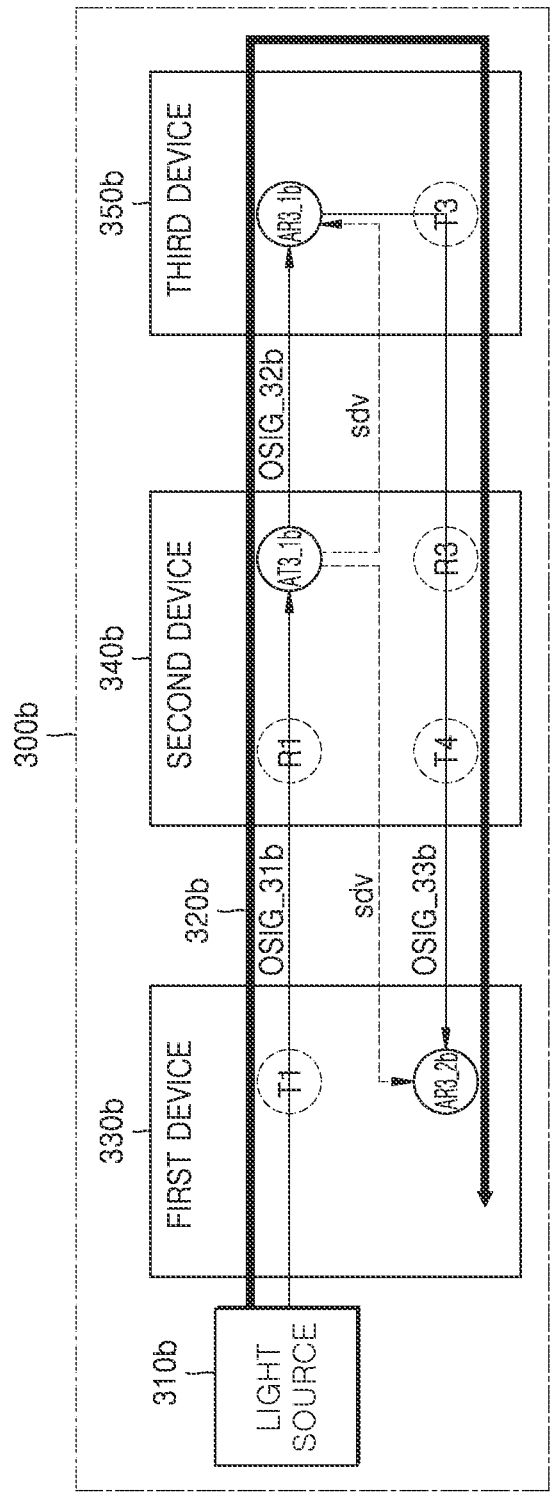
Figure 3C:
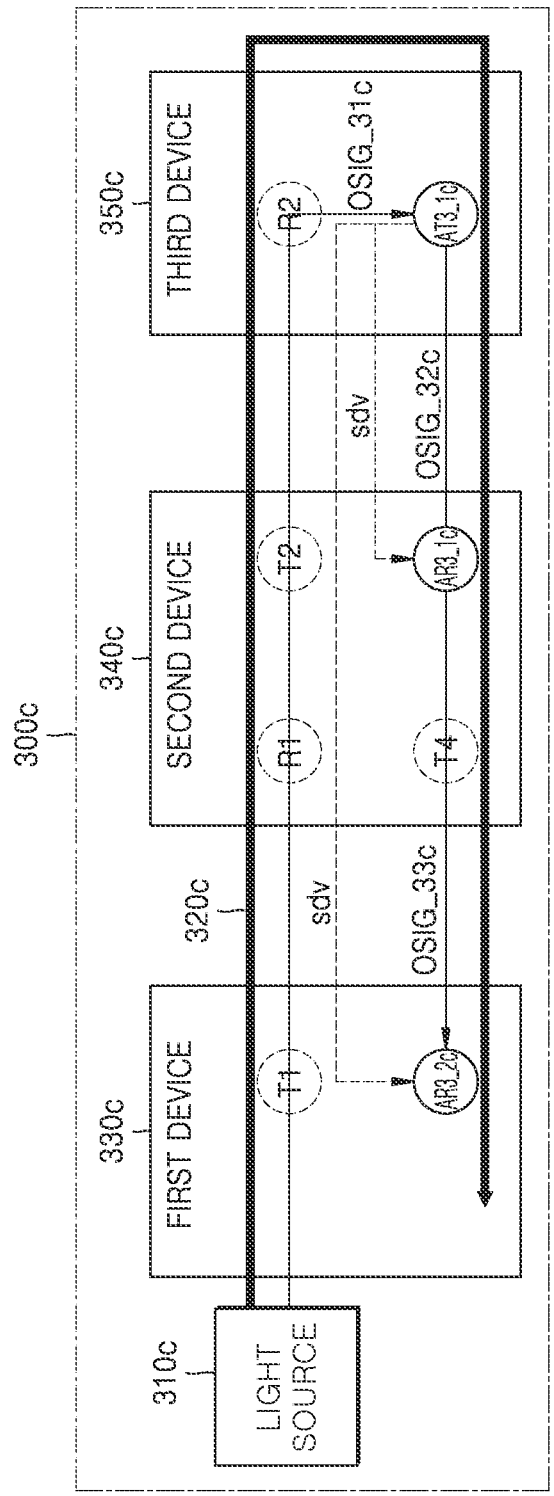

FIGS. 3A to 3C are block diagrams to explain operation of a first transmission mode. In greater detail, FIG. 3A is a block diagram illustrating that a first device 330a transmits the same data to a second device 340a and a third device 350a. FIG. 3B is a block diagram illustrating that a second device 340b transmits the same data to a first device 330b and a third device 350b. FIG. 3C is a block diagram illustrating that a third device 350c transmits the same data to a first device 330c and a second device 340c. FIGS. 3A to 3C may be described with reference to FIG. 1, and descriptions already given may be omitted.

Referring to FIG. 3A, the first device 330a may transmit a first transmission value sdv to the second device 340a and the third device 350a. That is, the system 300a may operate in the first transmission mode.

The system 300a may correspond to the system 100 of FIG. 1. A light source 310a may correspond to the light source 110 of FIG. 1. An optical channel 320a may correspond to the optical channel 120 of FIG. 1. The first device 330a may correspond to the first device 130 of FIG. 1. The second device 340a may correspond to the second device 140 of FIG. 1. The third device 350a may correspond to the third device 150 of FIG. 1.

The first device 330a may be referred to as a transmitter. The second device 340a may be referred to as a first receiver. The third device 350a may be referred to as a second receiver. The first transmitter T1 in FIG. 1 may be referred to as a first active transmitter AT3_1a. The first receiver R1 of FIG. 1 may be referred to as a first active receiver AR3_1a. The second receiver R2 of FIG. 1 may be referred to as a second active receiver AR3_2a.

The first active transmitter AT3_1a of FIG. 3A may operate in the first mode or the second mode, the first active receiver AR3_1a of FIG. 3A may operate in the second mode, the second active receiver AR3_2a of FIG. 3A may operate in the first mode, and the remaining deactivated transmitters or receivers may operate in the third mode. In some embodiments, even if the first active transmitter AT3_1a operates in the first mode or the second mode, the first active transmitter AT3_1a may operate in the third mode for a predetermined time period when the first active transmitter AT3_1a should not absorb the optical signal based on the transmission value.

The first device 330a may receive a first optical signal OSIG_31a from the light source 310a through the first active transmitter AT3_1a. The first active transmitter AT3_1a may encode the first optical signal OSIG_31a based on the first transmission value sdv under control by the first device 330a, and may output a second optical signal OSIG_32a having an adjusted light intensity.

The second device 340a may receive the second optical signal OSIG_32a from the first active transmitter AT3_1a through the first active receiver AR3_1a. The first active receiver AR3_1a may output a third optical signal OSIG_33a by adjusting the light intensity of the second optical signal OSIG_32a again under control by the second device 340a. The second device 340a may decode the second optical signal OSIG_32a received by the first active receiver AR3_1a and may read the first transmission value sdv.

The third device 350a may receive the third optical signal OSIG_33a from the first active receiver AR3_1a through the second active receiver AR3_2a. The third device 350a may decode the third optical signal OSIG_33a and may read the first transmission value sdv.

Referring to FIG. 3B, the second device 340b may transmit the first transmission value sdv to the first device 330a and the third device 350a. That is, a system 300b may operate in the first transmission mode.

The system 300b may correspond to system 100 of FIG. 1. A light source 310b may correspond to the light source 110 of FIG. 1. An optical channel 320b may correspond to the optical channel 120 of FIG. 1. The first device 330b may correspond to the first device 130 of FIG. 1. The second device 340a may correspond to the second device 140 of FIG. 1. The third device 350a may correspond to the third device 150 of FIG. 1.

The second device 340b may be referred to as a transmitter. The third device 350b may be referred to as a first receiver. The first device 330b may be referred to as a second receiver. The second transmitter T2 of FIG. 1 may be referred to as a first active transmitter AT3_1b. The second receiver R2 of FIG. 1 may be referred to as a first active receiver AR3_1b. The fourth receiver R4 of FIG. 1 may be referred to as a second active receiver AR3_2b.

The first active transmitter AT3_1b of FIG. 3B may operate in the first mode or the second mode, the first active receiver AR3_1b of FIG. 3B may operate in the second mode, the second active receiver AR3_2b of FIG. 3B may operate in the first mode, and the remaining deactivated transmitters or receivers may operate in the third mode. In some embodiments, even if the first active transmitter AT3_1b operates in the first mode or the second mode, the first active transmitter AT3_1b may operate in the third mode for a certain period of time when the optical signal should not be absorbed based on the transmission value.

The second device 340b may receive the first optical signal OSIG_31b from the light source 310b through the first active transmitter AT3_1b. The first active transmitter AT3_1b may encode the first optical signal OSIG_31b based on the first transmission value sdv under control by the second device 340b, and may output the second optical signal OSIG_32b having an adjusted light intensity.

The third device 350b may receive the second optical signal OSIG_32b from the first active transmitter AT3_1b through the first active receiver AR3_1b. The first active receiver AR3_1b may output a third optical signal OSIG_33b by adjusting the light intensity of the second optical signal OSIG_32b again under control by the third device 350b. The third device 350b may decode the second optical signal OSIG_32b received by the first active receiver AR3_1b to read the first transmission value sdv.

The first device 330b may receive the third optical signal OSIG_33b from the first active receiver AR3_1b through the second active receiver AR3_2b. The first device 330b may decode the third optical signal OSIG_33b and read the first transmission value sdv.

Referring to FIG. 3C, the third device 350c may transmit the first transmission value sdv to the first device 330c and the second device 340c. That is, a system 300c may operate in the first transmission mode.

The system 300c may correspond to system 100 of FIG. 1. A light source 310c may correspond to the light source 110 of FIG. 1. An optical channel 320c may correspond to the optical channel 120 of FIG. 1. The first device 330c may correspond to the first device 130 of FIG. 1. The second device 340c may correspond to the second device 140 of FIG. 1. The third device 350c may correspond to the third device 150 of FIG. 1.

The third device 350c may be referred to as a transmitter. The second device 340c may be referred to as a first receiver. The first device 330c may be referred to as a second receiver. The third transmitter T3 of FIG. 1 may be referred to as a first active transmitter AT3_1c. The third receiver R3 of FIG. 1 may be referred to as a first active receiver AR3_1c. The fourth receiver R4 of FIG. 1 may be referred to as a second active receiver AR3_2c.

The first active transmitter AT3_1c of FIG. 3c may operate in the first mode or the second mode, the first active receiver AR3_1c of FIG. 3c may operate in the second mode, the second active receiver AR3_2c of FIG. 3B may operate in the first mode, and the remaining deactivated transmitters or receivers may operate in the third mode. In some embodiments, even if the active transmitter AT3_1c operates in the first mode or the second mode, the active transmitter AT3_1c may operate in the third mode for a certain period of time when the optical signal should not be absorbed based on the transmission value.

The third device 350c may receive the first optical signal OSIG_31c from the light source 310c through the first active transmitter AT3_1c. The first active transmitter AT3_1c may encode the first optical signal OSIG_31c based on the first transmission value sdv under control by the third device 350c, and may output the second optical signal OSIG_32c having an adjusted light intensity.

The second device 340c may receive the second optical signal OSIG_32b from the first active transmitter AT3_1c through the first active receiver AR3_1c. The first active receiver AR3_1c may output the third optical signal OSIG_33c by adjusting the light intensity of the second optical signal OSIG_32c under control by the second device 340c. The second device 340c may decode the second optical signal OSIG_32c received by the first active receiver AR3_1c to read the first transmission value sdv.

The first device 330c may receive the third optical signal OSIG_33c from the first active receiver AR3_1c through the second active receiver AR3_2c. The first device 330c may decode the third optical signal OSIG_33c to read the first transmission value sdv.

Figure 4:
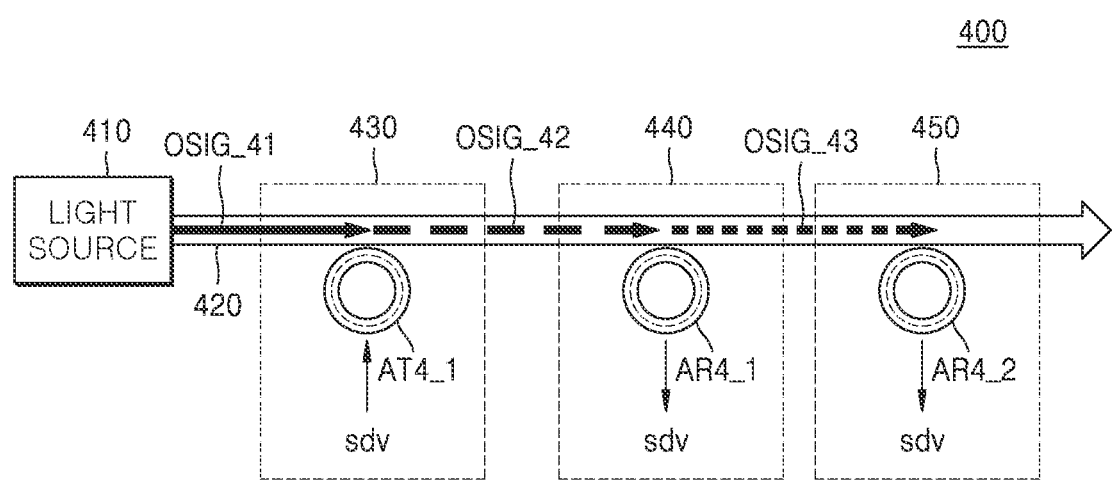
FIG. 4 is a diagram illustrating that a first device transmits the same data to a second device and a third device.

FIG. 4 is a diagram illustrating that a first device 430 may transmit the same data to a second device 440 and a third device 450. In greater detail, FIG. 4 is a diagram illustrating that the first device 430 transmits the same data to the second device 440 and the third device 450 when the first active transmitter AT4_1 operates in the first mode or the second mode. FIG. 4 may be described with reference to FIGS. 1, 3A, 3B, and 3C, and descriptions already given may be omitted.

Referring to FIG. 4, a system 400 may include a light source 410, an optical channel 420, a first device 430, a second device 440, and a third device 450.

The system 400 may correspond to the system 100 of FIG. 1. The light source 410 may correspond to the light source 110 of FIG. 1. The optical channel 420 may correspond to the optical channel 120 of FIG. 1. The first device 430 may correspond to the first device 130 of FIG. 1. The second device 440 may correspond to the second device 140 of FIG. 1. The third device 450 may correspond to the third device 150 of FIG. 1.

FIG. 4 shows that the first device 430 is the transmitter, the second device 440 is the first receiver, and the third device 450 is the second receiver, as shown in FIG. 3A, but this is only one example. In some embodiments, the second device 440 may be a transmitter, the third device 450 may be a first receiver, and the first device 430 may be a second receiver, as shown in FIG. 3B. In addition, in some embodiments, the third device 450 may be a transmitter, the second device 440 may be a first receiver, and the first device 430 may be a second receiver, as shown in FIG. 3C.

The light source 410 may output the first optical signal OSIG_41 having the first wavelength through the optical channel 420.

The first device 430 may include a first active transmitter AT4_1. The first active transmitter AT4_1 of the first device 430 may operate in a first mode or a second mode. The first device 430 may receive the first optical signal OSIG_41 through the first active transmitter AT4_1. The first device 430 may encode the first optical signal OSIG_41 by selectively absorbing a portion or all of the first optical signal OSIG_41 depending on the first transmission value sdv by controlling the first active transmitter AT4_1. The first device 430 may output the encoded optical signal, that is, a second optical signal OSIG_42 through the first active transmitter AT4_1.

The second device 440 may include a first active receiver AR4_1. The first active receiver AR4_1 of the second device 440 may operate in the second mode. The second device 440 may receive the second optical signal OSIG_42 through the first active receiver AR4_1. The second device 440 may read the first transmission value sdv based on a light intensity of the second optical signal OSIG_42. The second device 440 may adjust the intensity of light by selectively absorbing a portion of the second optical signal OSIG_42 by controlling the first active receiver AR4_1, and then may output a third optical signal OSIG_43.

The third device 450 may include a second active receiver AR4_2. The second active receiver AR4_2 of the third device 450 may operate in the first mode. The third device 450 may receive the third optical signal OSIG_43 through the second active receiver AR4_2. The third device 450 may read the first transmission value sdv based on a light intensity of the third optical signal OSIG_43. Because the second active receiver AR4_2 operates in the first mode, the optical signal may no longer be output from the second active receiver AR4_2.

In some embodiments, it is described assuming that the first device 430 transfers a first value of 1-bit data to the second device 440 and the third device 450 and the first active transmitter AT4_1 operates in the first mode or the second mode. That is, it is described assuming that the first transmission value sdv is the first value. Hereinafter, "1" may be referred to as a first value and "0" may be referred to as a second value in representing 1-bit binary data.

The light source 410 may generate the first optical signal OSIG_41 and output the first optical signal OSIG_41. The light intensity of the first optical signal OSIG_41 may be a first reference value.

The first device 430 may receive the first optical signal OSIG_41 through the first active transmitter AT4_1. In order for the first device 430 to transmit the first value to the second device 440 and the third device 450, the first device 430 may control the first active transmitter AT4_1 to maintain the light intensity of the first optical signal OSIG_41. Accordingly, the second optical signal OSIG_42 output from the first active transmitter AT4_1 of the first device 430 may be an optical signal having a light intensity of the first reference value. For example, the first active transmitter AT4_1 may operate temporarily in the third mode as described above with reference to FIG. 3C.

The second device 440 may receive the second optical signal OSIG_42 from the first active transmitter AT4_1 through the first active receiver AR4_1. As the light intensity of the second optical signal OSIG_42 corresponds to the first reference value, the second device 440 may determine that the data included in the second optical signal OSIG_42 is the first value, and thus read the first value, which is the first transmission value sdv. The second device 440 may absorb half of the second optical signal OSIG_42 by controlling the first active receiver AR4_1, and thus, the first active receiver AR4_1 may output a third optical signal OSIG_43 having a light intensity reduced by half compared to that of the second optical signal OSIG_42. That is, the light intensity of the third optical signal OSIG_43 may be the second reference value.

The third device 450 may receive the third optical signal OSIG_43 from the first active receiver AR4_1 through the second active receiver AR4_2. Because the light intensity of the third optical signal OSIG_43 is the second reference value, the third device 450 may determine that the data included in the third optical signal OSIG_43 is the first value, and thus read the first value, which is the first transmission value sdv. The third device 450 may absorb all of the third optical signal OSIG_43 by controlling the second active receiver AR4_2, and thus, the optical signal may no longer be output from the second active receiver AR4_2.

In some embodiments, the first device 430 may operate in the first mode when transferring the second value of 1-bit data to the second device 440 and the third device 450. The following description assumes the first transmission value sdv is the second value and the first device 430 operates in the first mode.

The light source 410 may generate a first optical signal OSIG_41 and output the first optical signal OSIG_41. The light intensity of the first optical signal OSIG_41 may be a first reference value.

The first device 430 may receive the first optical signal OSIG_41 through the first active transmitter AT4_1. In order for the first device 430 to transmit the second value to the transmitter AT4_1 so that all light of the first optical signal OSIG_41 is absorbed. Therefore, when the second optical signal OSIG_42 output from the first active transmitter AT4_1 of the first device 430 is compared with the first optical signal OSIG_41, the second optical signal OSIG_42 with very weak light intensity may be output. That is, the light intensity of the second optical signal OSIG_42 may be the fourth reference value.

The second device 440 may receive the second optical signal OSIG_42 from the first active transmitter AT4_1 through the first active receiver AR4_1. As the light intensity of the second optical signal OSIG_42 is the fourth reference value, the second device 440 may determine that the data included in the second optical signal OSIG_42 is the second value, and thus read the second value, which is the first transmission value sdv. The second device 440 may absorb half of the second optical signal OSIG_42 by controlling the first active receiver AR4_1. In this case, because the light intensity of the second optical signal OSIG_42 corresponds to the fourth reference value, the light intensity of the third optical signal OSIG_42 may also be the fourth reference value.

The third device 450 may receive the third optical signal OSIG_43 from the first active receiver AR4_1 through the second active receiver AR4_2. As the light intensity of the third optical signal OSIG_43 is the fourth reference value, the third device 450 may determine that the data included in the third optical signal OSIG_43 is the second value, and thus read the second value, which is the first transmission value sdv. The third device 450 may absorb all of the third optical signal OSIG_43 by controlling the second active receiver AR4_2, and thus, the optical signal may no longer be output from the second active receiver AR4_2.

In some embodiments, the first device 430 may operate in the second mode when transferring the second value of 1-bit data to the second device 440 and the third device 450. That is, the following description assumes that the first transmission value sdv is the second value and that the first active transmitter AT4_1 operates in the second mode.

The light source 410 may generate a first optical signal OSIG_41 and output the first optical signal OSIG_41. The light intensity of the first optical signal OSIG_41 may be a first reference value.

The first device 430 may receive the first optical signal OSIG_41 through the first active transmitter AT4_1. In order for the first device 430 to transmit the second value to the transmitter AT4_1 so that half of the light of the first optical signal OSIG_41 is absorbed. Accordingly, the light intensity of the second optical signal OSIG_42 output from the first active transmitter AT4_1 of the first device 430 may be a second reference value.

The second device 440 may receive the second optical signal OSIG_42 from the first active transmitter AT4_1 through the first active receiver AR4_1. As the light intensity of the second optical signal OSIG_42 is the second reference value, The second device 440 may determine that the data included in the second optical signal OSIG_42 is the second value, and thus read the second value, which is the first transmission value sdv. The second device 440 may control the first active receiver AR4_1 to absorb half of the second optical signal OSIG_42, and thus, the first active receiver AR4_1 may output a third optical signal OSIG_43 having a light intensity reduced by half compared to that of the second optical signal OSIG_42. That is, the light intensity of the third optical signal OSIG_43 may be a third reference value.

The third device 450 may receive the third optical signal OSIG_43 from the first active receiver AR4_1 through the second active receiver AR4_2. As the light intensity of the third optical signal OSIG_43 is the third reference value, the third device 450 may determine that the data included in the third optical signal OSIG_43 is the second value, and may thus read the second value, which is the first transmission value sdv. The third device 450 may absorb all of the third optical signal OSIG_43 by controlling the second active receiver AR4_2, and thus, the optical signal may no longer be output from the second active receiver AR4_2.

Figure 5:
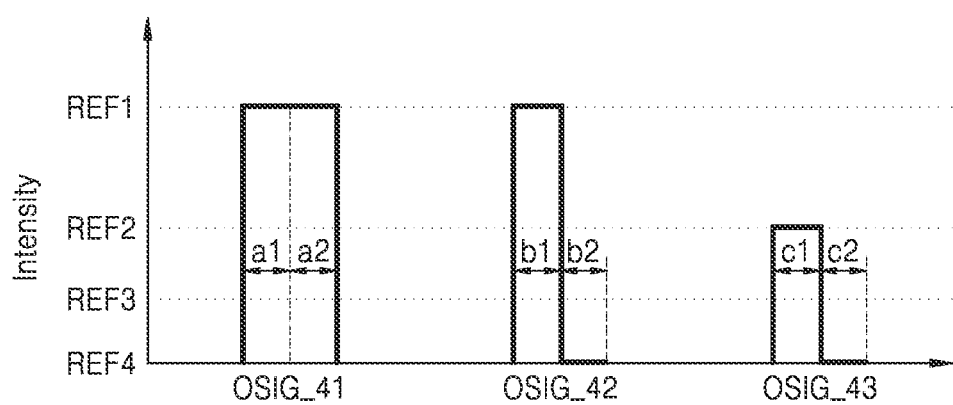
FIG. 5 is a diagram illustrating relative light intensities of optical signals when a first device of FIG. 4 transmits the same data to a second device and a third device.

FIG. 5 is a diagram illustrating relative light intensities of optical signals when a first device 430 of FIG. 4 transmits the same data to a second device 440 and a third device 450. In detail, in FIG. 5, it is assumed that the first device 430 transmits the same 2-bit data to the second device 440 and the third device 450 as a first transmission value sdv in FIG. 4. The graph of FIG. 5 is a graph showing that as the first optical signal OSIG_41, the second optical signal OSIG_42, and the third optical signal OSIG_43 pass through the first active transmitter AT4_1, the first active receiver AR4_1, and the second active receiver AR4_2, a portion or all of the optical signal is selectively absorbed, thereby adjusting the light intensity of the optical signal.

In FIG. 5, it is assumed that the first active transmitter AT4_1 may operate in the first mode. FIG. 5 may be described with reference to FIG. 4, and descriptions already given may be omitted.

In some embodiments, it is described assuming that the first device 430 transfers 2-bit data of "10" to the second device 440 and the third device 450. That is, it is described assuming that the first value "1" and the second value "0" are sequentially transmitted as the first transmission value sdv.

The light source 410 may generate a first optical signal OSIG_41 and output the first optical signal OSIG_41 during time periods a1 and a2. In order for the first device 430 to transmit the first transmission value sdv to the second device 440 and the third device 450, the first optical signal OSIG_41 may have the light intensity of the first reference value REF1 as shown in FIG. 5.

The first device 430 may control the first active transmitter AT4_1 to adjust the intensity of light by selectively absorbing all or part of the first optical signal OSIG_41 based on the first transmission value sdv. As shown in FIG. 5, the light intensity of the second optical signal OSIG_42 may be adjusted to have the light intensity of the first reference value REF1 and the light intensity of the fourth reference value REF4. Accordingly, the second optical signal OSIG_42 may be an optical signal encoded to indicate the first transmission value sdv. For example, the first device 430 may control the first active transmitter AT4_1 to output a second optical signal OSIG_42 having a light intensity of the first reference value REF1 in the time period b1 by not absorbing the first optical signal OSIG_41 in the time period a1 (e.g., temporarily operating in the third mode). The first device 430 may control the first active transmitter AT4_1 to output a second optical signal OSIG_42 having the light intensity of the fourth reference value REF4 in the time period b2 by absorbing all of the first optical signal OSIG_42 in the time period a2.

The second device 440 may determine that the data contained in the second optical signal OSIG_42 is the first transmission value sdv, based on the light intensity of the second optical signal OSIG_42. That is, because the second optical signal OSIG_42 has the light intensity of the first reference value REF1 in the time period b1, the second device 440 may determine the second optical signal OSIG_42 in the time period b1 as data representing the first value, and because the second optical signal OSIG_42 has the light intensity of the fourth reference value REF4 in the time period b2, the second device 440 may determine the second optical signal OSIG_42 in the time period b2 as data representing the second value. Accordingly, the second device 440 may read the first transmission value sdv.

The second device 440 may absorb half of the second optical signal OSIG_42 by controlling the first active receiver AR4_1, and thus, the first active receiver AR4_1 may output a third optical signal OSIG_43 having a light intensity reduced by half compared to the light intensity of the second optical signal OSIG_42. For example, the second device 440 may control the first active receiver AR4_1 to output a third optical signal OSIG_43 having a light intensity of a second reference value REF2 in the time period c1 by absorbing half of the second optical signal OSIG_42 in the time period b1. For example, the second device 440 may control the first active receiver AR4_1 to output a third optical signal OSIG_43 having a light intensity of a fourth reference value REF4 in the time period c2 by absorbing all of the second optical signal OSIG_42 in the time period b2.

The third device 450 may determine that the data contained in the third optical signal OSIG_43 is the first transmission value sdv based on the light intensity of the third optical signal OSIG_43, and thus read the first transmission value sdv. That is, because the third optical signal OSIG_43 has the light intensity of the second reference value REF2 in the time period c1, the third device 450 may determine the third optical signal OSIG_43 in the time period c1 as data representing the first value, and because the third optical signal OSIG_43 has the light intensity of the fourth reference value REF4 in the time period c2, the third device 450 may determine the third optical signal OSIG_43 in the time period c2 as data representing the second value. Accordingly, the third device 450 may read the first transmission value sdv.

The third device 450 may absorb all of the third optical signal OSIG_43 by controlling the second active receiver AR4_2, and thus, the optical signal may no longer be output from the second active receiver AR4_2.

Figure 6:
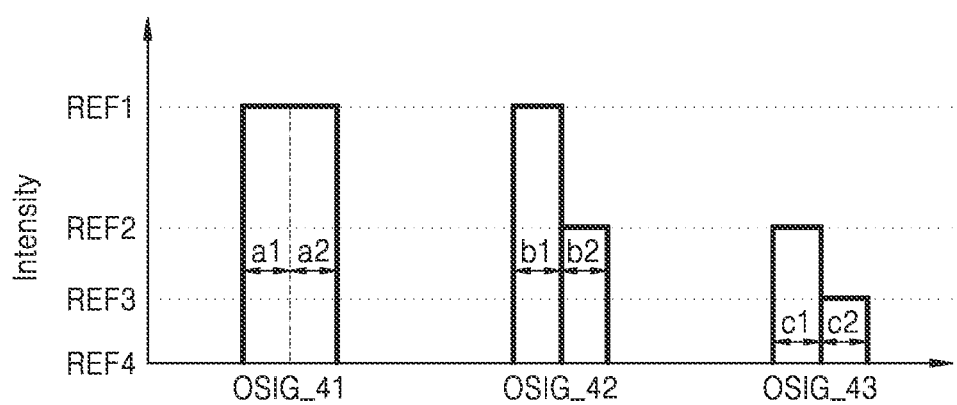
FIG. 6 is a diagram illustrating light intensity of an optical signal when a first device of FIG. 4 transmits the same data to a second device and a third device.

FIG. 6 is a diagram illustrating light intensity of an optical signal when a first device 430 of FIG. 4 transmits the same data to a second device 440 and a third device 450. In greater detail, in the case of FIG. 6 and in contrast to FIG. 5, the first active transmitter AT4_1 may operate in the second mode. FIG. 6 may be described with reference to FIGS. 4 and 5, and descriptions already given may be omitted.

In some embodiments, it is described assuming that the first device 430 transfers 2-bit data of "10" to the second device 440 and the third device 450. That is, it is described assuming that the first value "1" and the second value "0" are sequentially transmitted as the first transmission value sdv.

The light source 410 may generate a first optical signal OSIG_41 and output the first optical signal OSIG_41 during time periods a1 and a2. In order for the first device 430 to transmit the first transmission value sdv to the second device 440 and the third device 450, the first optical signal OSIG_41 may have the light intensity of the first reference value REF1 as shown in FIG. 6.

The first device 430 may control the first active transmitter AT4_1 to adjust the intensity of light by selectively absorbing a part of the first optical signal OSIG_41 based on the first transmission value sdv. As shown in FIG. 6, the light intensity of the second optical signal OSIG_42 may be adjusted to have the light intensity of the first reference value REF1 and the light intensity of the second reference value REF2. Accordingly, the second optical signal OSIG_42 may be an optical signal encoded to indicate the first transmission value sdv. For example, the first device 430 may control the first active transmitter AT4_1 to output a second optical signal OSIG_42 having a light intensity of the first reference value REF1 in the time period b1 by not absorbing the first optical signal OSIG_41 in the time period a1. For example, the first device 430 may control the first active transmitter AT4_1 to output a second optical signal OSIG_42 having the light intensity of the fourth reference value REF4 in the time period b2 by half absorbing the first optical signal OSIG_42 in the time period a2.

The second device 440 may determine that the data contained in the second optical signal OSIG_42 is the first transmission value sdv, based on the light intensity of the second optical signal OSIG_42. That is, because the second optical signal OSIG_42 has the light intensity of the first reference value REF1 in the time period b1, the second device 440 may determine the second optical signal OSIG_42 in the time period b1 as data representing the first value, and because the second optical signal OSIG_42 has the light intensity of the second reference value REF2 in the time period b2, the second device 440 may determine the second optical signal OSIG_42 in the time period b2 as data representing the second value. Accordingly, the second device 440 may read the first transmission value sdv.

The second device 440 may absorb half of the second optical signal OSIG_42 by controlling the first active receiver AR4_1, and thus, the first active receiver AR4_1 may output a third optical signal OSIG_43 having a light intensity reduced by half compared to the light intensity of the second optical signal OSIG_42. For example, the second device 440 may control the first active receiver AR4_1 to output a third optical signal OSIG_43 having a light intensity of a second reference value REF2 in the time period c1 by half absorbing the second optical signal OSIG_42 in the time period b1. For example, the second device 440 may control the first active receiver AR4_1 to output a third optical signal OSIG_43 having a light intensity of a third reference value REF3 in the time period c2 by absorbing all of the second optical signal OSIG_42 in the time period b2.

The third device 450 may determine that the data contained in the third optical signal OSIG_43 is the first transmission value sdv based on the light intensity of the third optical signal OSIG_43, and thus read the first transmission value sdv. That is, because the third optical signal OSIG_43 has the light intensity of the second reference value REF2 in the time period c1, the third device 450 may determine the third optical signal OSIG_43 in the time period c1 as data representing the first value, and because the third optical signal OSIG_43 has the light intensity of the third reference value REF3 in the time period c2, the third device 450 may determine the third optical signal OSIG_43 in the time period c2 as data representing the second value. Accordingly, the third device 450 may read the first transmission value sdv.

The third device 450 may absorb all of the third optical signal OSIG_43 by controlling the second active receiver AR4_2, and thus, the optical signal may no longer be output from the second active receiver AR4_2.

Figure 7:
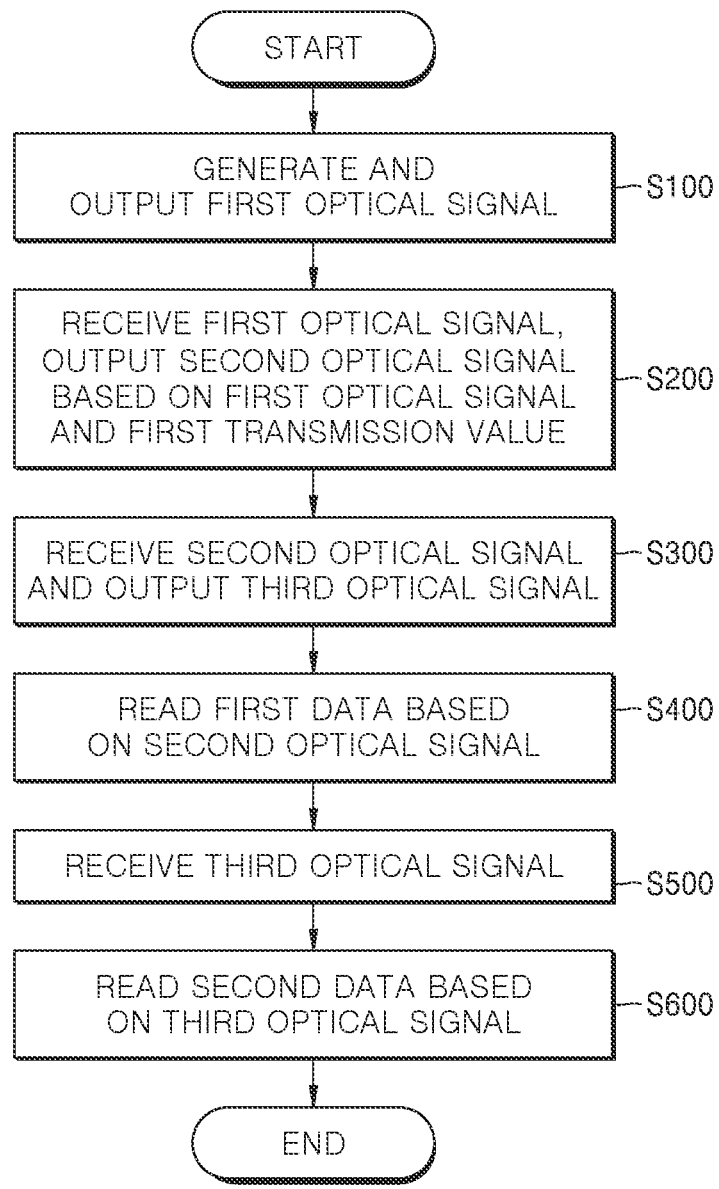
FIG. 7 is a flowchart illustrating a method of operating a system, according to some embodiments.

FIG. 7 is a flowchart illustrating a method of operating a system 300a, according to some embodiments. In greater detail, FIG. 7 illustrates an operation method when the first device 330a transmits the same data to the second device 340a and the third device 350a according to some embodiments. FIG. 7 may be described with reference to FIGS. 1 and 3A, and descriptions already given may be omitted.

In FIG. 7, it is described assuming that the first device 330a is a transmitter, the second device 340a is a first receiver, and the third device 350a is a second receiver with reference to FIG. 3A. However, this is only example, and as shown in FIG. 3B, the second device 340b may be a transmitter, the third device 350b may be a first receiver, and the first device 330b may be a second receiver. In addition, as shown in FIG. 3C, the third device 350c may be a transmitter, the second device 340c may be a first receiver, and the first device 330c may be a second receiver.

In operation S100, the light source 310a may generate a first optical signal OSIG_31a. The light source 310a may output the generated first optical signal OSIG_31a.

In operation S200, the first active transmitter AT3_1a may receive the first optical signal OSIG_31a from the light source 310a. The first active transmitter AT3_1a may encode the first optical signal to output the second optical signal by absorbing a portion or all of the first optical signal OSIG_31a based on the first transmission value sdv under control by the first device 330a.

In operation S300, the first active receiver AR3_1a of the second device 340a may receive the second optical signal OSIG_32a from the first active transmitter AT3_1a. The second device 340a may output the third optical signal OSIG_33a. In some embodiments, the first active receiver AR3_1a included in the second device 340a may output the third optical signal OSIG_33a by adjusting the light intensity of the second optical signal OSIG_32a again under control by the second device 340a.

In operation S400, the second device 340a may read data by decoding the second optical signal OSIG_32a received by the first active receiver AR3_1a. The read data may be the first transmission value sdv.

In operation S500, the third device 350a may receive the third optical signal OSIG_33a from the second device 340a. In some embodiments, the second active receiver AR3_2a may receive the third optical signal OSIG_33a from the first active receiver AR3_1a.

In operation S600, the third device 350a may decode the third optical signal OSIG_33a to read data. The read data may be the first transmission value sdv.

Figure 8A:
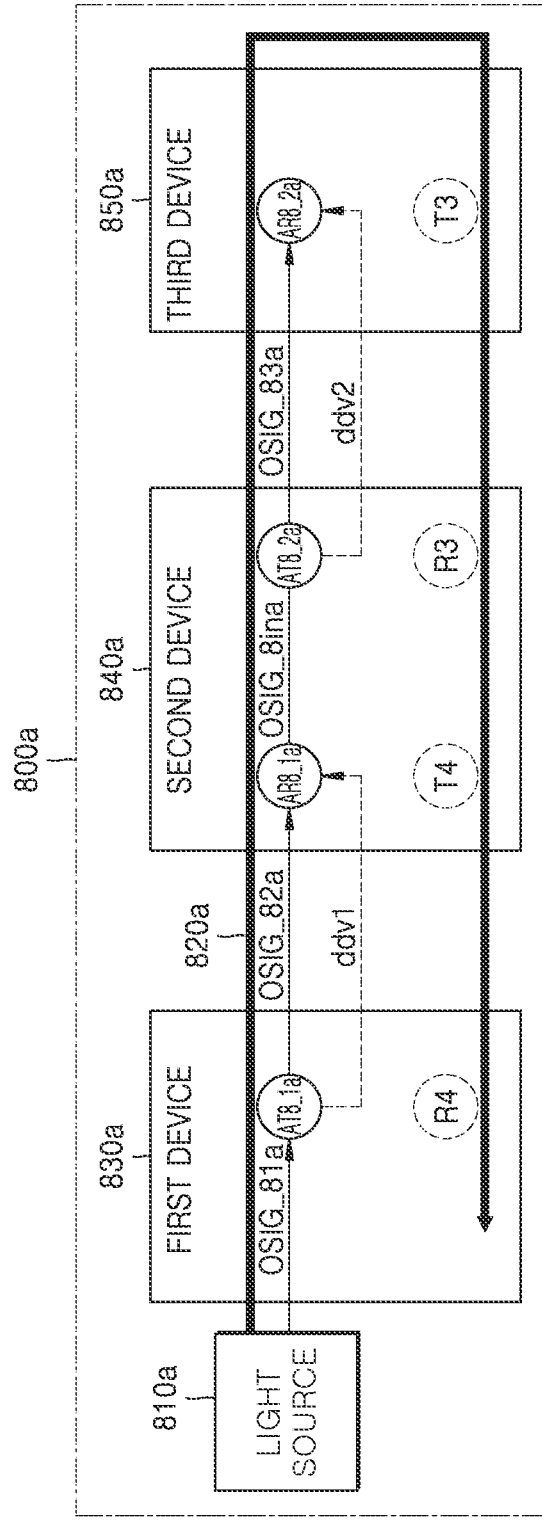
FIGS. 8A, 8B, 8C, and 8D are block diagrams to explain operation of a second transmission mode.
Figure 8B:
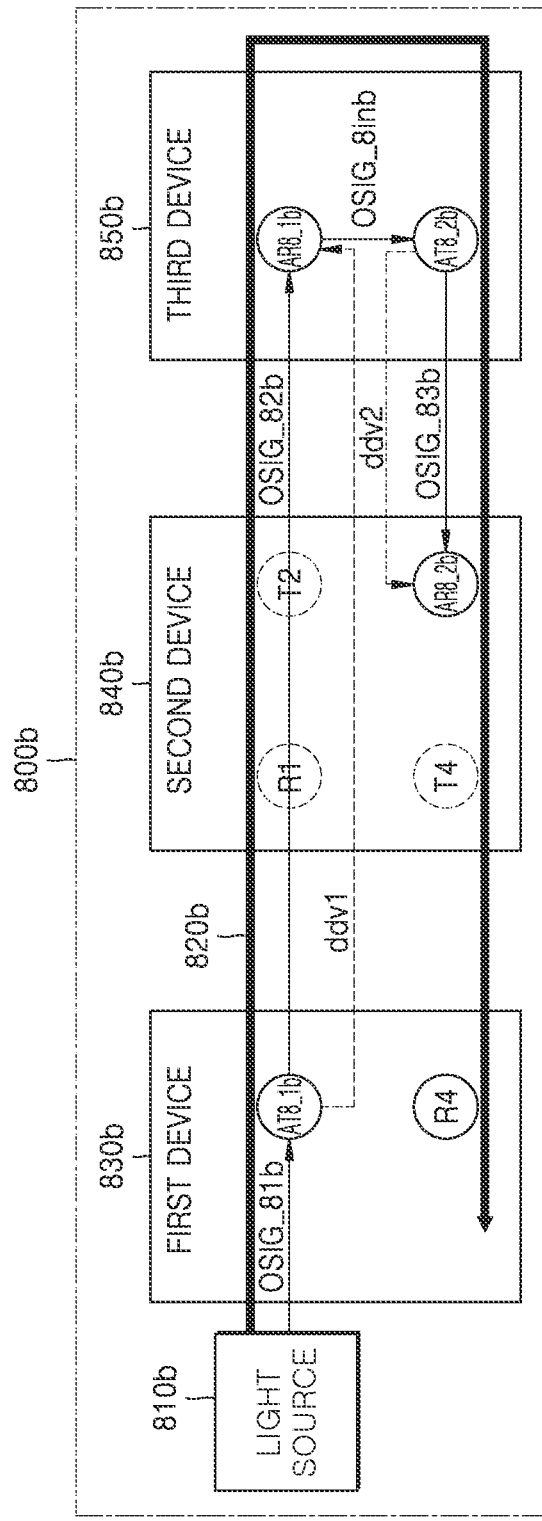
Figure 8C:
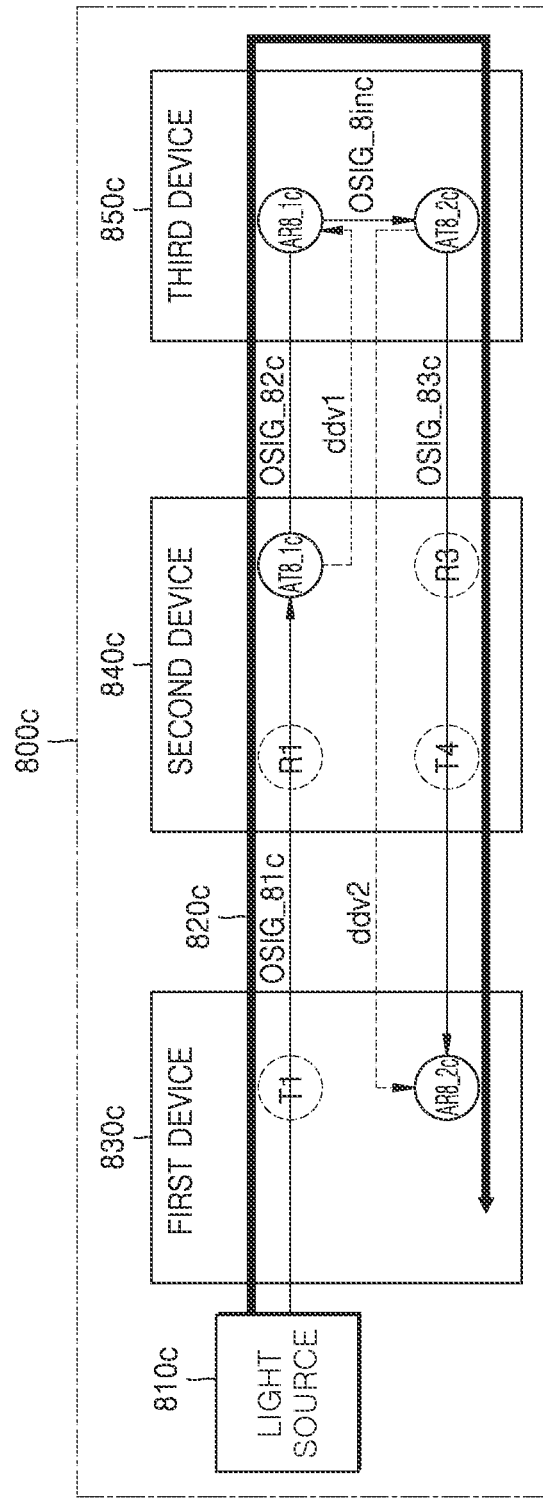
Figure 8D:
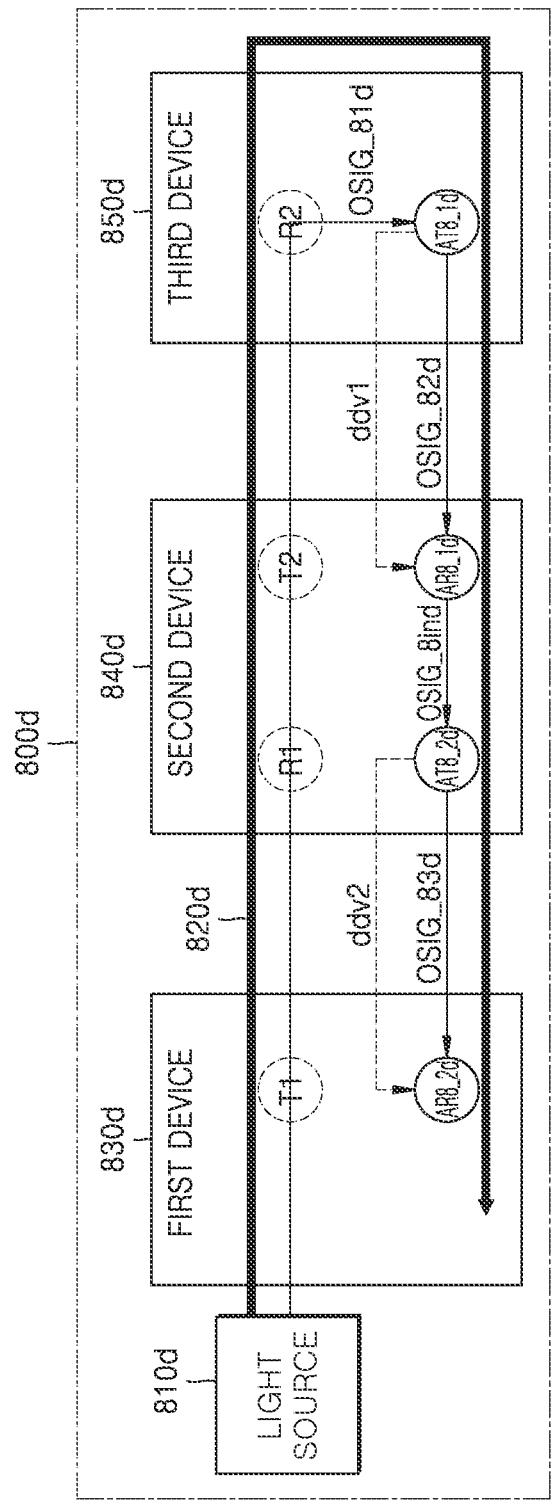

FIGS. 8A to 8D are block diagrams to explain operation of a second transmission mode In greater detail, FIG. 8A is a block diagram illustrating that a first device 830a transmits a first transmission value ddv1 to a second device 840a and the second device 840a transmits a second transmission value ddv2 to a third device 850a. FIG. 8B is a block diagram illustrating that a first device 830b transmits a first transmission value ddv1 to a third device 850b and the third device 850b transmits the second transmission value ddv2 to a second device 840b. FIG. 8C is a block diagram illustrating that a second device 840c transmits a first transmission value ddv1 to a third device 850c and the third device 850c transmits a second transmission value ddv2 to a first device 830c. FIG. 8D is a block diagram illustrating that a third device 850d transmits a first transmission value ddv1 to a second device 840d and the second device 840d transmits a second transmission value ddv2 to a first device 830d. FIGS. 8A to 8D may be described with reference to FIG. 1, and descriptions already given may be omitted. Hereinafter, the first transmission value ddv1 and the second transmission value ddv2 may be different from each other.

Referring to FIG. 8A, the first device 830a may transmit the first transmission value ddv1 to the second device 840a, and the second device 840a may transmit the second transmission value ddv2 to the third device 850a.

A system 800a may correspond to system 100 of FIG. 1. A light source 810a may correspond to the light source 110 of FIG. 1. An optical channel 820a may correspond to the optical channel 120 of FIG. 1. The first device 830a may correspond to the first device 130 of FIG. 1. The second device 840a may correspond to the second device 140 of FIG. 1. The third device 850a may correspond to the third device 150 of FIG. 1.

The first device 830a may be referred to as a transmitter. The second device 840a may be referred to as a transceiver. The third device 850a may be referred to as a receiver. The first transmitter T1 in FIG. 1 may be referred to as a first active transmitter AT8_1a. The first receiver R1 in FIG. 1 may be referred to as a first active receiver AR8_1a. The second transmitter T2 in FIG. 1 may be referred to as a second active transmitter AT8_2a. The second receiver R2 of FIG. 1 may be referred to as a second active receiver AR8_2a.

The first active transmitter AT8_1a may operate in either a first mode or a second mode. The first active receiver AR8_1a may operate in the second mode. The second active transmitter AT8_2a may operate in the first mode. The second active receiver AR8_2a may operate in the first mode. The remaining deactivated transmitters or receivers may operate in the third mode.

The first device 830a may receive the first optical signal OSIG_81a from the light source 810a through the first active transmitter AT8_1a. The first active transmitter AT8_1a may encode the first optical signal OSIG_81a based on the first transmission value ddv1 under control by the first device 830a and output a second optical signal having an adjusted light intensity.

The second device 840a may receive the second optical signal OSIG_82a from the first active transmitter AT8_1a through the first active receiver AR8_1a. The first active receiver AR8_1a may output an internal optical signal OSIG_8ina by adjusting the light intensity of the second optical signal OSIG_82a under control by the second device 840a. The second device 840a may decode the second optical signal OSIG_82a received by the first active receiver AR8_1a to read the first transmission value ddv1.

The second active transmitter AT8_2a of the second device 840a may receive the internal optical signal OSIG_8ina from the first active receiver AR8_1a. The second active transmitter AT8_2a may encode the internal optical signal OSIG_8ina based on the second transmission value ddv2 under control by the second device 840a and then output a third optical signal OSIG_83a.

The third device 850a may receive the third optical signal OSIG_83a from the second active transmitter AT8_2a through the second active receiver AR8_2a. The third device 850a may decode the third optical signal OSIG_83a to read the second transmission value ddv2.

Referring to FIG. 8B, the first device 830b may transmit the first transmission value ddv1 to the third device 850b, and the third device 850b may transmit the second transmission value ddv2 to the second device 840b.

A system 800b may correspond to system 100 of FIG. 1. A light source 810b may correspond to the light source 110 of FIG. 1. An optical channel 820b may correspond to the optical channel 120 of FIG. 1. The first device 830b may correspond to the first device 130 of FIG. 1. The second device 840*b* may correspond to the second device 140 of FIG. 1. The third device 850*b* may correspond to the third device 150 of FIG. 1.

The first device 830*b* may be referred to as a transmitter. The third device 850*b* may be referred to as a transceiver. The second device 840*b* may be referred to as a receiver. The first transmitter T1 in FIG. 1 may be referred to as a first active transmitter AT8_1*b*. The second receiver R2 of FIG. 1 may be referred to as a first active receiver AR8_1*b*. The third transmitter T3 of FIG. 1 may be referred to as a second active transmitter AT8_2*b*. The third receiver R3 of FIG. 1 may be referred to as a second active receiver AR8_2*b*.

The first active transmitter AT8_1*b* may operate in either a first mode or a second mode. The first active receiver AR8_1*b* may operate in the second mode. The second active transmitter AT8_2*b* may operate in the first mode. The second active receiver AR8_2*b* may operate in the first mode. The remaining deactivated transmitters or receivers may operate in a third mode.

The first device 830*b* may receive the first optical signal OSIG_81*b* from the light source 810*b* through the first active transmitter AT8_1*b*. The first active transmitter AT8_1*b* may encode the first optical signal OSIG_81*b* based on the first transmission value ddv1 under control by the first device 830*b* and output a second optical signal OSIG_82*b* having an adjusted light intensity.

The third device 850*b* may receive the second optical signal OSIG_82*b* from the first active transmitter AT8_1*b* through the first active receiver AR8_1*b*. The first active receiver AR8_1*b* may output the internal optical signal OSIG_8*inb* by adjusting the light intensity of the second optical signal OSIG_82*b* again under control by the third device 850*b*. The third device 850*b* may decode the second optical signal OSIG_82*b* received by the first active receiver AR8_1*b* to read the first transmission value ddv1.

The second active transmitter AT8_2*b* of the third device 850*b* may receive the internal optical signal OSIG_8*inb* from the first active receiver AR8_1*b*. The second active transmitter AT8_2*b* may encode the internal optical signal OSIG_8*inb* based on the second transmission value ddv2 under control by the third device 850*b*, and then may output the third optical signal OSIG_83*b*.

The second device 840*b* may receive the third optical signal OSIG_83*b* from the second active transmitter AT8_2*b* through the second active receiver AR8_2*b*. The second device 840*b* may decode the third optical signal OSIG_83*b* to read the second transmission value ddv2.

Referring to FIG. 8C, the second device 840*c* may transmit the first transmission value ddv1 to the third device 850*c*, and the third device 850*c* may transmit the second transmission value ddv2 to the first device 830*c*.

A system 800*c* may correspond to system 100 of FIG. 1. A light source 810*c* may correspond to the light source 110 of FIG. 1. An optical channel 820*c* may correspond to the optical channel 120 of FIG. 1. The first device 830*c* may correspond to the first device 130 of FIG. 1. The second device 840*c* may correspond to the second device 140 of FIG. 1. The third device 850*c* may correspond to the third device 150 of FIG. 1.

The second device 840*c* may be referred to as a transmitter. The third device 850*c* may be referred to as a transceiver. The first device 830*c* may be referred to as a receiver. The second transmitter T2 in FIG. 1 may be referred to as a first active transmitter AT8_1*c*. The second receiver R2 of FIG. 1 may be referred to as a first active receiver AR8_1*c*. The third transmitter T3 in FIG. 1 may be referred to as a second active transmitter AT8_2*c*. The fourth receiver R4 in FIG. 1 may be referred to as a second active receiver AR8_2*c*.

The first active transmitter AT8_1*c* may operate in either a first mode or a second mode. The first active receiver AR8_1*c* may operate in the second mode. The second active transmitter AT8_2*c* may operate in the first mode. The second active receiver AR8_2*c* may operate in the first mode. The remaining deactivated transmitters or receivers may operate in a third mode.

The second device 840*c* may receive the first optical signal OSIG_81*c* from the light source 810*c* through the first active transmitter AT8_1*c*. The first active transmitter AT8_1*c* may encode the first optical signal OSIG_81*c* based on the first transmission value ddv1 under control by the second device 840*c* and output the second optical signal OSIG_82*c* having an adjusted light intensity.

The third device 850*c* may receive the second optical signal OSIG_82*c* from the first active transmitter AT8_1*c* through the first active receiver AR8_1*c*. The first active receiver AR8_1*c* may output the internal optical signal OSIG_8*inc* by adjusting the light intensity of the second optical signal OSIG_82*c* again under control by the third device 850*c*. The third device 850*c* may decode the second optical signal OSIG_82*c* received by the first active receiver AR8_1*c* to read the first transmission value ddv1.

The second active transmitter AT8_2*c* of the third device 850*c* may receive the internal optical signal OSIG_8*inc* from the first active receiver AR8_1*c*. The second active transmitter AT8_2*c* may encode the internal optical signal OSIG_8*inc* based on the second transmission value ddv2 under control by the third device 850*c*, and then may output the third optical signal OSIG_83*c*.

The first device 830*c* may receive the third optical signal OSIG_83*c* from the second active transmitter AT8_2*c* through the second active receiver AR8_2*c*. The first device 830*c* may decode the third optical signal OSIG_83*c* to read the second transmission value ddv2.

Referring to FIG. 8D, the third device 850*d* may transmit the first transmission value ddv1 to the second device 840*d*, and the second device 840*d* may transmit the second transmission value ddv2 to the first device 830*d*.

A system 800*d* may correspond to system 100 of FIG. 1. A light source 810*d* may correspond to the light source 110 of FIG. 1. An optical channel 820*d* may correspond to the optical channel 120 of FIG. 1. The first device 830*d* may correspond to the first device 130 of FIG. 1. The second device 840*d* may correspond to the second device 140 of FIG. 1. The third device 850*d* may correspond to the third device 150 of FIG. 1.

The third device 850*d* may be referred to as a transmitter. The second device 840*d* may be referred to as a transceiver. The first device 830*d* may be referred to as a receiver. The third transmitter T3 in FIG. 1 may be referred to as a first active transmitter AT8_1*c*. The third receiver R3 of FIG. 1 may be referred to as a first active receiver AR8_1*d*. The fourth transmitter T4 in FIG. 1 may be referred to as a second active transmitter AT8_2*d*. The fourth receiver R4 in FIG. 1 may be referred to as a second active receiver AR8_2*d*.

The first active transmitter AT8_1*d* may operate in either a first mode or a second mode. The first active receiver AR8_1*d* may operate in the second mode. The second active transmitter AT8_2*d* may operate in the first mode. The second active receiver AR8_2*d* may operate in the first mode. The remaining deactivated transmitters or receivers may operate in a third mode.

The third device 850*d* may receive the first optical signal OSIG_81*d* from the light source 810*d* through the first active transmitter AT8_1*d*. The first active transmitter AT8_1*d* may encode the first optical signal OSIG_81*d* based on the first transmission value ddv1 under control by the third device 850*d* and output the second optical signal OSIG_82*d* having an adjusted light intensity.

The second device 840*d* may receive the second optical signal OSIG_82*d* from the first active transmitter AT8_1*d* through the first active receiver AR8_1*d*. The first active receiver AR8_1*d* may output the internal optical signal OSIG_8*ind* by adjusting the light intensity of the second optical signal OSIG_82*d* again under control by the second device 840*d*. The second device 840*d* may decode the second optical signal OSIG_82*d* received by the first active receiver AR8_1*d* to read the first transmission value ddv1.

The second active transmitter AT8_2*d* of the second device 840*d* may receive the internal optical signal OSIG_8*ind* from the first active receiver AR8_1*d*. The second active transmitter AT8_2*d* may encode the internal optical signal OSIG_8*ind* based on the second transmission value ddv2 under control by the second device 840*d*, and then may output the third optical signal OSIG_83*d*.

The first device 830*d* may receive the third optical signal OSIG_83*d* from the second active transmitter AT8_2*d* through the second active receiver AR8_2*d*. The first device 830*d* may decode the third optical signal OSIG_83*d* to read the second transmission value ddv2.

Figure 9:
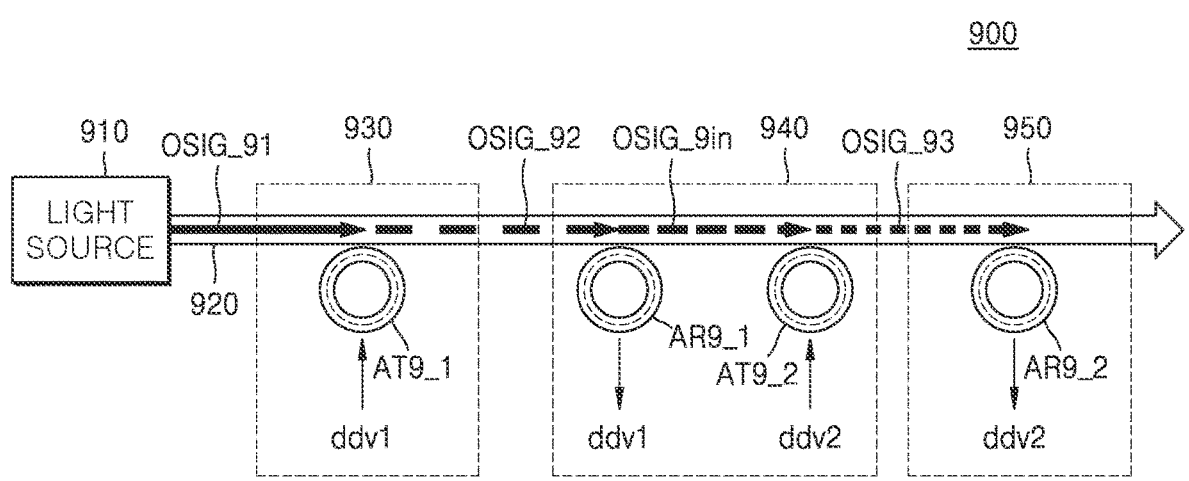
FIG. 9 is a diagram illustrating that a first device transmits a first transmission value to a second device, and the second device transmits a second transmission value to a third device.

FIG. 9 is a diagram illustrating that a first device transmits a first transmission value ddv1 to a second device, and the second device transmits a second transmission value ddv2 to a third device. In greater detail, FIG. 9 is a diagram illustrating that a first device 930 transmits a first transmission value ddv1 to a second device 940 and a second device 940 transmits a second transmission value ddv2 to a third device 950, when a first active transmitter AT9_1 operates in a first mode or a second mode. In this case, the first transmission value ddv1 may be a different value from the second transmission value ddv2. FIG. 9 may be described with reference to FIGS. 1, 4, 8A, 8B, 8C, and 8D, and descriptions already given may be omitted.

Referring to FIG. 9, a system 900 may include a light source 910, an optical channel 920, the first device 930, the second device 940, and the third device 950.

The system 900 may correspond to system 100 of FIG. 1. The light source 910 may correspond to the light source 110 of FIG. 1. The optical channel 920 may correspond to the optical channel 120 of FIG. 1. The optical channel 920 may correspond to the optical channel 120 of FIG. 1. The second device 940 may correspond to the second device 140 of FIG. 1. The third device 950 may correspond to the third device 150 of FIG. 1.

FIG. 9 illustrates that the first device 930 is a transmitter, the second device 940 is a transceiver, and the third device 950 is a receiver, as shown in FIG. 8A, but this is only one example, and the first device 930 may be a transmitter, the third device 950 may be a transceiver, and the second device 940 may be a receiver, as shown in FIG. 8B. Alternatively, as shown in FIG. 8C, the second device 940 may be a transmitter, the third device 950 may be a transceiver, and the first device 930 may be a receiver. Alternatively, as shown in FIG. 8D, the third device 950 may be a transmitter, the second device 940 may be a transceiver, and the first device 930 may be a receiver.

The light source 910 may output a first optical signal OSIG_91 having the first wavelength through the optical channel 920.

The first device 930 may include the first active transmitter AT9_1. The first active transmitter AT9_1 of the first device 930 may operate in a first mode or a second mode. The first device 930 may receive the first optical signal OSIG_91 through the first active transmitter AT9_1. The first device 930 may encode the first optical signal OSIG_91 by selectively absorbing a portion or all of the first optical signal OSIG_91 depending on the first transmission value ddv1 by controlling the first active transmitter AT9_1. The first device 930 may output an encoded optical signal, that is, a second optical signal OSIG_92 through the first active transmitter AT_91.

The second device 940 may include a first active receiver AR9_1 and a second active transmitter AT9_2. The first active receiver AR9_1 of the second device 940 may operate in the second mode. The second device 940 may receive the second optical signal OSIG_92 through the first active receiver AR9_1. The second device 940 may read the first transmission value ddv1 based on the light intensity of the second optical signal OSIG_92. The second device 940 may selectively absorb a portion or all of the second optical signal OSIG_92 by controlling the first active receiver AR9_1 to adjust the intensity of light, and then output an internal optical signal OSIG_9 in.

The second active transmitter AT9_2 of the second device 940 may operate in the first mode. The second active transmitter AT9_2 may receive the internal optical signal OSIG_9 in. The second device 940 may encode the internal optical signal OSIG_9in by selectively absorbing a portion or all of the internal optical signal OSIG_9in by controlling the second active transmitter AT9_2 based on the second transmission value ddv2. The second device 940 may output an encoded optical signal, that is, a third optical signal OSIG_93 through the second active transmitter AT9_2.

The third device 950 may include a second active receiver AR9_2. The second active receiver AR9_2 of the third device 950 may operate in the first mode. The third device 950 may receive the third optical signal OSIG_93 through the second active receiver AR9_2. The third device 950 may read the second transmission value ddv2 based on the light intensity of the third optical signal OSIG_93. As the second active receiver AR9_2 operates in the first mode, the optical signal may no longer be output from the second active receiver AR9_2.

In some embodiments, it is described assuming that the first device 930 transfers a first value, which is 1-bit data, to the second device 940, the second device 940 transfers a second value, which is 1-bit data, to the third device 950, and the first active transmitter AT9_1 operates in the second mode. That is, it described assuming that the first transmission value ddv1 is the first value and the second transmission value ddv2 is the second value.

The light source 910 may generate a first optical signal OSIG_91 and output the first optical signal OSIG_91. The light intensity of the first optical signal OSIG_91 may be a first reference value.

The first device 930 may receive the first optical signal OSIG_91 through the first active transmitter AT9_1. In order for the first value to be transmitted to the second device 940, the first device 930 may control the first active transmitter AT9_1 so that the light intensity of the first optical signal OSIG_91 is maintained at the first value. Accordingly, the second optical signal OSIG_92 output from the first active transmitter AT9_1 of the first device 930 may be an optical signal having a light intensity of the first reference value.

Accordingly, the second optical signal OSIG_92 output from the first active transmitter AT9_1 of the first device 930 may be an optical signal having a light intensity of the first reference value. Because the light intensity of the second optical signal OSIG_92 is the first reference value, the second device 940 may determine that the data included in the second optical signal OSIG_92 is the first value, and thus read the first value, which is the first transmission value ddv1.

The second device 940 may absorb half of the second optical signal OSIG_92 by controlling the first active receiver AR9_1, and thus the first active receiver AR9_1 may output the internal optical signal OSIG_9in having a light intensity of the second reference value in which the light intensity is reduced by half compared to the second optical signal OSIG_92. The second active transmitter AT9_2 may receive the internal optical signal OSIG_9in and output a third optical signal OSIG_93. In order for the second value to be transmitted to the third device 950, the second device 940 may control the second active transmitter AT9_2 so that the light intensity of the third optical signal OSIG_93 reaches the fourth reference value by adjusting the light intensity of the internal optical signal OSIG_9 in. Accordingly, the third optical signal OSIG_93 output from the second active transmitter AT9_2 may be an optical signal having a light intensity of the fourth reference value.

The third device 950 may receive the third optical signal OSIG_93 from the second active transmitter AT9_2 through the second active receiver AR9_2. Because the light intensity of the third optical signal OSIG_93 is the fourth reference value, the third device 950 may determine that the data included in the third optical signal OSIG_93 is the second value, and thus read the second value, which is the second transmission value ddv2. The third device 950 may absorb all of the third optical signal OSIG_93 by controlling the second active receiver AR9_2, and thus the optical signal may no longer be output from the second active receiver AR9_2.

In some embodiments, it is described assuming that the first device 930 transfers a second value, which is 1-bit data, to the second device 940, the second device 940 transfers a first value, which is 1-bit data, to the third device 950, and the first active transmitter AT9_1 operates in the second mode. That is, it described assuming that the first transmission value ddv1 is the second value and the second transmission value ddv2 is the first value.

The light source 910 may generate a first optical signal OSIG_91 and output the first optical signal OSIG_91. The light intensity of the first optical signal OSIG_91 may be a first reference value.

The first device 930 may receive the first optical signal OSIG_91 through the first active transmitter AT9_1. In order for the second value to be transmitted to the second device 940, the first device 930 may control the first active transmitter AT9_1 so that the light intensity of the first optical signal OSIG_91 becomes half of the first value. Accordingly, the second optical signal OSIG_92 output from the first active transmitter AT9_1 of the first device 930 may be an optical signal having a light intensity of the second reference value.

The second device 940 may receive the second optical signal OSIG_92 from the first active transmitter AT9_1 through the first active receiver AR9_1. Because the light intensity of the second optical signal OSIG_92 is the second reference value, the second device 940 may determine that the data included in the second optical signal OSIG_92 is the second value, and thus read the second value, which is the first transmission value ddv1.

The second device 940 may absorb half of the second optical signal OSIG_92 by controlling the first active receiver AR9_1, and thus the first active receiver AR9_1 may output an internal optical signal OSIG_9in having a light intensity of the third reference value in which the light intensity is reduced by half compared to that of the second optical signal OSIG_92. The second active transmitter AT9_2 may receive the internal optical signal OSIG_9in and output a third optical signal OSIG_93. In order for the second device 940 to transmit the first value to the third device 950, the second device 940 may control the second active transmitter AT9_2 so that the light intensity of the third optical signal OSIG_93 is maintained at the third reference value. Accordingly, the third optical signal OSIG_93 output from the second active transmitter AT9_2 may be an optical signal having a light intensity of the third reference value.

The third device 950 may receive the third optical signal OSIG_93 from the second active transmitter AT9_2 through the second active receiver AR9_2. Because the light intensity of the third optical signal OSIG_93 is the third reference value, the third device 950 may determine that the data included in the third optical signal OSIG_93 is the first value, and thus may read the first value, which is the second transmission value ddv2. The third device 950 may absorb all of the third optical signal OSIG_93 by controlling the second active receiver AR9_2, and thus the optical signal may no longer be output from the second active receiver AR9_2.

Figure 10:
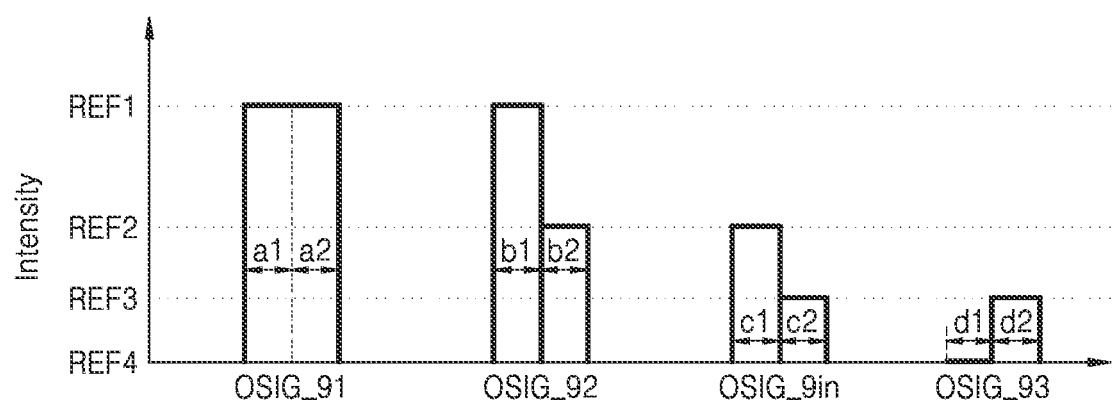
FIG. 10 is a diagram illustrating relative light intensities of optical signals when a first device of FIG. 9 transmits a first transmission value to a second device, and the second device transmits a second transmission value to a third device.

FIG. 10 is a diagram illustrating relative light intensities of optical signals when a first device 930 of FIG. 9 transmits a first transmission value ddv1 to a second device 940, and the second device transmits a second transmission value ddv2 to a third device 950. In greater detail, in FIG. 10, it is assumed that the first device 930 transmits 2-bit data "10" to the second device 940 as the first transmission value ddv1 and the second device 940 transmits 2-bit data "01" to the third device 950 as a second transmission value ddv2 in FIG. 9. That is, it is described assuming that the first value "1" and the second value "0" are sequentially transmitted as the first transmission value ddv1 and the second value "0" and the first value "1" are sequentially transmitted as the second transmission value ddv2. The graph of FIG. 10 is a graph showing that as the first optical signal OSIG_91, the internal optical signal OSIG_9 in, and the third optical signal OSIG_93 pass through the first active transmitter AT9_1, the first active receiver AR9_1, the second active transmitter AR9_2, and the second active receiver AR9_2, a portion or all of the optical signal is selectively absorbed, thereby adjusting the light intensity of the optical signal.

The first active transmitter AT9_1 may operate in the second mode. FIG. 10 may be described with reference to FIGS. 1 and 9, and descriptions already given may be omitted.

In some embodiments, the light source 910 may generate the first optical signal OSIG_91 and output the first optical signal OSIG_91 during time periods a1 and a2. In order for the first device 930 to transmit the first transmission value ddv1 to the second device 940, the first optical signal OSIG_91 may have the light intensity of the first reference value REF1 as shown in FIG. 10.

The first device 930 may control the first active transmitter AT9_1 to adjust the intensity of light by selectively absorbing all or part of the first optical signal OSIG_91 based on the first transmission value ddv1. As shown in FIG. 9, the light intensity of the second optical signal OSIG_92 may be adjusted to have the light intensity of the first reference value REF1 and the light intensity of the second reference value REF2. Accordingly, the second optical signal OSIG_92 may be an optical signal encoded to indicate the first transmission value ddv1. For example, the first device 930 may control the first active transmitter AT9_1 to output a second optical signal OSIG_92 having a light intensity of the first reference value REF1 in the time period b1 by not absorbing the first optical signal OSIG_91 in the time period a1. For example, the first device 930 may control the first active transmitter AT9_1 to output a second optical signal OSIG_92 having the light intensity of the second reference value REF2 in the time period b2 by half absorbing the first optical signal OSIG_91 in the time period a2.

The second device 940 may determine that the data included in the second optical signal OSIG_92 is the first transmission value ddv1 based on the light intensity of the second optical signal OSIG_92. That is, because the second optical signal OSIG_92 has the light intensity of the first reference value REF1 in the time period b1, the second device 940 may determine the second optical signal OSIG_92 in the time period b1 as data representing the first value, and because the second optical signal OSIG_92 has the light intensity of the second reference value REF2 in the time period b2, the second device 940 may determine the second optical signal OSIG_92 in the time period b2 as data representing the second value. Accordingly, the second device 940 may read the first transmission value ddv1.

The second device 940 may absorb half of the second optical signal OSIG_92 by controlling the first active receiver AR9_1, and thus the first active receiver AR9_1 may output an internal optical signal OSIG_9in of which light intensity is reduced by half compared to that of the second optical signal OSIG_92. For example, the second device 940 may control the first active receiver AR9_1 to output an internal optical signal OSIG_9in having a light intensity of a second reference value REF2 in the time period c1 by absorbing half of the second optical signal OSIG_92 in the time period b1. For example, the second device 940 may control the first active receiver AR9_1 to output an internal optical signal OSIG_9in having a light intensity of a third reference value REF3 in the time period c2 by absorbing all of the second optical signal OSIG_92 in the time period b2.

In order for the second device 940 to transmit the second transmission value ddv2 to the third device 950, the second device 940 may control the second active transmitter AT9_2 to adjust the light intensity by selectively absorbing all or part of the internal optical signal OSIG_9in based on the second transmission value ddv2. The light intensity of the third optical signal OSIG_93 may be adjusted to have the light intensity of the fourth reference value REF4 and the light intensity of the third reference value REF3, as shown in FIG. 10 Accordingly, the third optical signal OSIG_93 may be an optical signal encoded to indicate the second transmission value ddv2. For example, the second device 940 may control the second active receiver AR9_2 to output a third optical signal OSIG_93 having a light intensity of a fourth reference value REF4 in the time period d1 by absorbing all of the second optical signal OSIG_92 in the time period c1. For example, the second device 940 may control the second active transmitter AT9_2 to output a third optical signal OSIG_93 having a light intensity of the third reference value REF3 in the time period d2 by not absorbing the internal optical signal OSIG_9in in the time period c2.

The third device 950 may determine that the data included in the third optical signal OSIG_93 is the second transmission value ddv2 based on the light intensity of the third optical signal OSIG_93, and thus read the second transmission value ddv2. That is, because the third optical signal OSIG_93 has the light intensity of the fourth reference value REF4 in the time period d1, the third device 950 may determine the third optical signal OSIG_93 in the time period d1 as data representing the second value, and because the third optical signal OSIG_93 has the light intensity of the third reference value REF3 in the time period d2, the third device 950 may determine the third optical signal OSIG_93 in the time period d2 as data representing the first value. Accordingly, the third device 950 may read the second transmission value ddv2. The third device 950 may absorb all of the third optical signal OSIG_93 by controlling the second active receiver AR9_2, and thus the optical signal may no longer be output from the second active receiver AR9_2.

Figure 11:
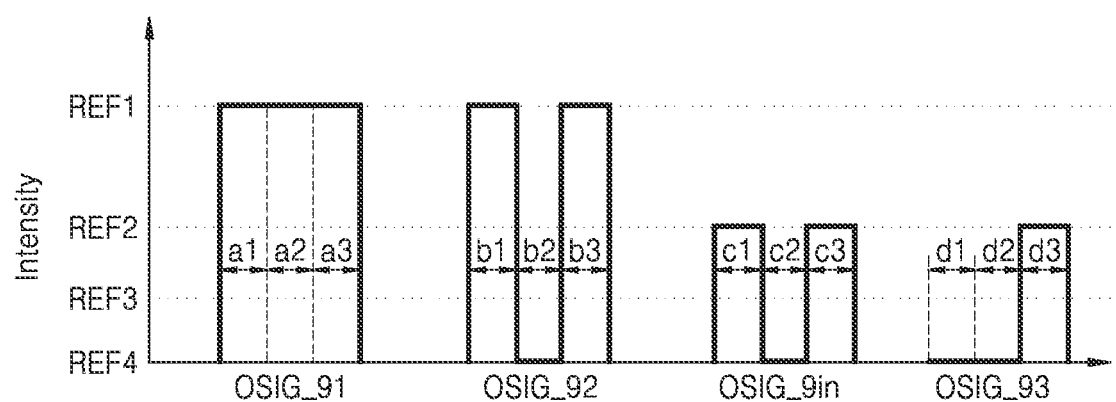
FIG. 11 is a diagram illustrating relative light intensities of optical signals when a first device of FIG. 9 transmits a first transmission value to a second device and the second device transmits a second transmission value to a third device.

FIG. 11 is a diagram illustrating relative light intensities of optical signals when a first device 930 of FIG. 9 transmits a first transmission value ddv1 to a second device 940 and the second device 940 transmits a second transmission value ddv2 to a third device 950. In greater detail, encoding of an optical signal according to FIG. 11 may be referred to as write-once memory (WOM) coding. FIG. 11 may be described with reference to FIGS. 1, 9, and 10, and descriptions already given may be omitted.

In contrast with FIG. 10, FIG. 11 assumes that the first active transmitter AT9_1 operates in the first mode. In FIG. 11, it is assumed that the first device 930 transmits 2-bit data "10" to the second device 940 as the first transmission value ddv1 and the second device 940 transmits 2-bit data "01" to the third device 950 as a second transmission value ddv2 in FIG. 9. Hereinafter, 2-bit data "00" may be referred to as a third value, 2-bit data "01" may be referred to as a fourth value, 2-bit data "10" may be referred to as a fifth value, and 2-bit data "11" may be referred to as a sixth value. That is, it is described assuming that the fifth value is transmitted as the first transmission value ddv1 and the fourth value is transmitted as the second transmission value ddv2. The graph of FIG. 11 is a graph showing that as the first optical signal OSIG_91, the second optical signal OSIG_92, the internal optical signal OSIG_9 in, and the third optical signal OSIG_93 pass through the first active transmitter AT9_1, the first active receiver AR9_1, the second active transmitter AR9_2, and the second active receiver AR9_2, a portion or all of the optical signal is selectively absorbed, thereby adjusting the light intensity of the optical signal.

In some embodiments, the light source 910 may generate the first optical signal OSIG_91 and output the first optical signal OSIG_91 during the time period a1 to a3. In order for the first device 930 to transmit the first transmission value ddv1 to the second device 940, the first optical signal OSIG_91 may have the light intensity of the first reference value REF1 as shown in FIG. 11.

The first device 930 may control the first active transmitter AT9_1 to adjust the intensity of light by selectively absorbing all or part of the first optical signal OSIG_91 based on the first transmission value ddv1. As shown in FIG. 11, the light intensity of the second optical signal OSIG_92 may be adjusted to have the light intensity of the first reference value Rill and the light intensity of the fourth reference value REF4. Accordingly, the second optical signal OSIG_92 may be an optical signal encoded to indicate the first transmission value ddv1. For example, the first device 930 may control the first active transmitter AT9_1 to output a second optical signal OSIG_92 having a light intensity of the first reference value REF1 in the time period b1 by not absorbing the first optical signal OSIG_41 in the time period a1. For example, the first device 930 may control the first active transmitter AT9_1 to output a second optical signal OSIG_92 having the light intensity of the fourth reference value REF4 in the time period b2 by absorbing all of the first optical signal OSIG_91 in the time period a2. For example, the first device 930 may control the first active transmitter AT9_1 to output a second optical signal OSIG_92 having a light intensity of the first reference value REF1 in the time period b3 by not absorbing the first optical signal OSIG_91 in the time period a3.

The second device 940 may determine that the data included in the second optical signal OSIG_92 is the first transmission value ddv1 based on the light intensity of the second optical signal OSIG_92. That is, because the time period b1 of the second optical signal OSIG_92 has the light intensity of the first reference value REF1, the time period b2 has the light intensity of the fourth reference value REF4, and x the time period b3 has the light intensity of the first reference value REF1, the second device 940 may determine that the second optical signal OSIG_92 is data representing the fifth value. Accordingly, the second device 940 may read the first transmission value ddv1.

The second device 940 may absorb half of the second optical signal OSIG_92 by controlling the first active receiver AR9_1, and thus the first active receiver AR9_1 may output an internal optical signal OSIG_9in of which light intensity is reduced by half compared to that of the second optical signal OSIG_92. For example, the second device 940 may control the first active receiver AR9_1 to output an internal optical signal OSIG_9in having a light intensity of a second reference value REF2 in the time period c1 by half absorbing the second optical signal OSIG_92 in the time period b1. For example, the second device 940 may control the first active receiver AR9_1 to output an internal optical signal OSIG_9in having a light intensity of a fourth reference value REF4 in the time period c2 by half absorbing the second optical signal OSIG_92 in the time period b2. For example, the second device 940 may control the first active receiver AR9_1 to output an internal optical signal OSIG_9in having a light intensity of a second reference value REF2 in the time period c3 by half absorbing the second optical signal OSIG_92 in the time period b3.

In order for the second device 940 to transmit the second transmission value ddv2 to the third device 950, the second device 940 may control the second active transmitter AT9_2 to adjust the light intensity by selectively absorbing all or part of the internal optical signal OSIG_9in based on the second transmission value ddv2. As shown in FIG. 11, the light intensity of the third optical signal OSIG_93 may be adjusted to have the light intensity of the second reference value REF2 and the light intensity of the fourth reference value REF4. Accordingly, the third optical signal OSIG_93 may be an optical signal encoded to indicate the second transmission value ddv2. For example, the second device 940 may control the second active receiver AR9_2 to output a third optical signal OSIG_93 having a light intensity of a fourth reference value REF4 in the time period d1 by absorbing all of the second optical signal OSIG_92 in the time period c1. For example, the second device 940 may control the second active transmitter AT9_2 to output a third optical signal OSIG_93 having a light intensity of the fourth reference value REF4 in the time period d2 by absorbing all of the internal optical signal OSIG_9in in the time period c2. For example, the second device 940 may control the second active transmitter AT9_2 to output a third optical signal OSIG_93 having a light intensity of the second reference value REF2 in the time period d3 by not absorbing the internal optical signal OSIG_9in in the time period c3.

The third device 950 may determine that the data included in the third optical signal OSIG_93 is the second transmission value ddv2 based on the light intensity of the third optical signal OSIG_93, and thus read the second transmission value ddv2. That is, because the time period d1 of the third optical signal OSIG_93 has the light intensity of the fourth reference value REF4, the time period d2 also has the light intensity of the fourth reference value REF4, and the time period d3 has the light intensity of the second reference value REF2, the third device 950 may determine that the second optical signal OSIG_92 is data representing the fourth value. Accordingly, the third device 950 may read the second transmission value ddv2.

The third device 950 may absorb all of the third optical signal OSIG_93 by controlling the second active receiver AR9_2, and thus the optical signal may no longer be output from the second active receiver AR9_2.

FIG. 12 is a table showing a mapping table utilized in WOM coding according to FIG. 11. In greater detail, FIG. 12 is a diagram for explaining the relative light intensity of the second optical signal OSIG_92 that is an encoded optical signal in a case where the first active transmitter AT9_1 controls the light intensity of the first optical signal OSIG_91 depending on the value of the first transmission value ddv1 to encode a first optical signal OSIG_91, when the first device 930 of FIG. 9 transmits the first transmission value ddv1 to the second device 940. Similarly, FIG. 12 is a diagram for explaining the relative light intensity of the third optical signal OSIG_93 that is an encoded optical signal in a case where the second active transmitter AT9_2 controls the light intensity of the internal optical signal OSIG_9in depending on the value of the second transmission value ddv2 to encode the internal optical signal OSIG_9 in, when a second device 940 transmits the second transmission value ddv2 to a third device 950. FIG. 12 is described with reference to FIGS. 1, 9, and 11, and descriptions already given may be omitted.

As shown in FIG. 11, each of the first optical signal OSIG_91, the second optical signal OSIG_92, the internal optical signal OSIG_9 in, and the third optical signal OSIG_93 may be divided into three time periods. For example, the first optical signal OSIG_91 may be divided into a time period a1, a time period a2, and a time period a3. For example, the second optical signal OSIG_92 may be divided into time period b1, time period b2, and time period b3. For example, the internal optical signal OSIG_9in may be divided into time period c1, time period c2, and time period c3. For example, the third optical signal OSIG_93 may be divided into time period d1, time period d2, and time period d3.

In the table of FIG. 12, and the representation of the intensity of light for each time period of the second optical signal OSIG_92, 1 may mean a first reference value and 0 may mean a fourth reference value. Similarly, the representation of the intensity of light for each time period of the third optical signal OSIG_93, ½ may mean the second reference value, and 0 may mean the fourth reference value.

The first active transmitter AT9_1 may selectively absorb a portion or all of the first optical signal OSIG_91 based on the value of the first transmission value ddv1 under control by the first device 930 to output the second optical signal OSIG_92. In this case, the first optical signal OSIG_91 may be an optical signal having a first reference value in the time period a1, the time period a2, and the time period a3.

In some embodiments, when the first transmission value ddv1 is a third value, the first active transmitter AT9_1 may not absorb the first optical signal OSIG_91. Accordingly, the second optical signal OSIG_92 may have the light intensity of the first reference value in the time period b1, the time period b2, and the time period b3.

In some embodiments, when the first transmission value ddv1 is a fourth value, the first active transmitter AT9_1 may absorb all of the optical signal OSIG_91 corresponding to the time period a3. Accordingly, the second optical signal OSIG_92 may have the light intensity of the first reference value in the time periods b1 and b2, and may have the light intensity of the fourth reference value in the time period b3.

In some embodiments, when the first transmission value ddv1 is a fifth value, the first active transmitter AT9_1 may absorb all of the first optical signal OSIG_91 corresponding to the time period a2. Accordingly, the second optical signal OSIG_92 may have the light intensity of the first reference value in the time period b1, may have the light intensity of the fourth reference value in the time period b2, and may have the light intensity of the first reference value in the time period b3.

In some embodiments, when the first transmission value ddv1 is a sixth value, the first active transmitter AT9_1 may absorb all of the first optical signal OSIG_91 corresponding to the time period a1. The second optical signal OSIG_92 may have the light intensity of the fourth reference value in the time period b1 and may have the light intensity of the first reference value in the time period b2 and b3.

The second active transmitter AT9_2 may selectively absorb a portion or all of the internal optical signal depending on the second transmission value ddv2 to be transmitted by the second device 940 to output the third optical signal OSIG_93. In this case, because the internal optical signal OSIG_9in is output from the first active receiver AR9_1 operating in the second mode, the light intensity of the internal optical signal OSIG_9in in all time periods may not exceed the second reference value.

In some embodiments, when the second transmission value ddv2 is the third value, the second active transmitter AT9_2 may absorb all of the internal optical signal OSIG_9 in. Accordingly, the third optical signal OSIG_93 may have the light intensity of the fourth reference value in the time period d1, the time period d2, and the time period d3.

In some embodiments, when the second transmission value ddv2 is the fourth value, the second active transmitter AT9_2 may absorb all of the internal optical signal OSIG_9in corresponding to the time period c1 and the time period c2. Accordingly, the third optical signal OSIG_93 may have the light intensity of the fourth reference value in the time period d1 and the time period d2, and may have the light intensity of the second reference value in the time period d3.

In some embodiments, when the second transmission value ddv2 is the fifth value, the second active transmitter AT9_2 may absorb all of the internal optical signal OSIG_9in corresponding to the time period c1 and the time period c3. Accordingly, the third optical signal OSIG_93 may have the light intensity of the fourth reference value in the time period d1, may have the light intensity of the second reference value in the time period d2, and may have the light intensity of the fourth reference value in the time period d3.

In some embodiments, when the second transmission value ddv2 is the sixth value, the second active transmitter AT9_2 may absorb all of the internal optical signal OSIG_9in corresponding to the time period c2 and the time period c3. Accordingly, the third optical signal OSIG_93 may have the light intensity of the second reference value in the time period d1 and may have the light intensity of the fourth reference value in the time period d2 and the time period d3.

When the first transmission value ddv1 is equal to the second transmission value ddv2, the first active transmitter AT9_1 may operate in the first mode, the first active receiver AR9_1 may operate in the second mode, the second active transmitter AT9_2 may operate in the third mode, and the second active receiver AR9_2 may operate in the first mode. Because the second active transmitter AT9_2 operates in the third mode, the second active transmitter AT9_2 may not absorb the received internal optical signal OSIG_9 in, and thus the light intensity of the third optical signal OSIG_93 output from the second active transmitter AT9_2 may be maintained as the light intensity of the internal optical signal OSIG_9 in. That is, the light intensity in the time period c1 of the internal light signal OSIG_9in may be the same as the light intensity in the time period d1 of the third light signal OSIG_93, the light intensity in the time period c2 of the internal light signal OSIG_9in may be the same as the light intensity in the time period d2 of the third light signal OSIG_93, and the intensity of light in the time period c3 of the internal light signal OSIG_9in may be the same as the intensity of light in the time period d3 of the third light signal OSIG_93.

For example, when both the first transmission value ddv1 and the second transmission value ddv2 are the third value, the second light signal OSIG_92 may have the light intensity of the first reference value in the time period b1, the time period b2, and the time period b3. The internal optical signal OSIG_9in may have light intensity of the second reference value in the time period c1, the time period c2, and the time period c3. The third optical signal may have the light intensity of the second reference value in the time period d1, the time period d2, and the time period d3. The second active receiver AR9_2 may read data based on the light intensity of the third optical signal OSIG_93 and thus read a third value corresponding to the second transmission value ddv2.

For example, when both the first transmission value ddv1 and the second transmission value ddv2 are the fourth value, the second light signal OSIG_92 may have the light intensity of the first reference value in the time periods b1 and b2, and may have the light intensity of the fourth reference value in the time period b3. The internal optical signal OSIG_9in may have the light intensity of the second reference value in the time periods c1 and c2, and may have the light intensity of the fourth reference value in the time period c3. The third optical signal may have the light intensity of the second reference value in the time period d1 and the time period d2, and may have the light intensity of the fourth reference value in the time period d3.

For example, when both the first transmission value ddv1 and the second transmission value ddv2 are the fifth value, the light signal OSIG_92 may have the light intensity of the first reference value in the time periods b1 and b3, and may have the light intensity of the fourth reference value in the time period b2. The internal optical signal OSIG_9in may have the light intensity of the second reference value in the time period c1 and the time period c3, and may have the light intensity of the fourth reference value in the time period c2. The third optical signal OSIG_93 may have the light intensity of the second reference value in the time period d1 and the time period d3, and may have the light intensity of the fourth reference value in the time period d2.

For example, when both the first transmission value ddv1 and the second transmission value ddv2 are the sixth value, the second light signal OSIG_92 may have the light intensity of the first reference value in the time periods b2 and b3, and may have the light intensity of the fourth reference value in the time period b1. The internal optical signal OSIG_9in may have the light intensity of the second reference value in the time periods c2 and c3, and may have the light intensity of the fourth reference value in the time period c1. The third optical signal OSIG_93 may have the light intensity of the second reference value in the time periods d2 and d3, and may have the light intensity of the fourth reference value in the time period d1.

FIG. 13 is a flowchart illustrating a method of operating a system 800a according to some embodiments. In greater detail, FIG. 13 illustrates an operating method when a first device 830a transmits a first transfer value ddv1 to a second device 840a and the second device 840a transmits a second transfer value ddv2 to a third device 850a according to an embodiment. The first transmission value ddv1 may be a different value from the second transmission value ddv2. FIG. 13 may be described with reference to FIGS. 1, 7, and 8A, and descriptions already given may be omitted.

In FIG. 13, it is described assuming that the first device 830a is a transmitter, the second device 840a is a transceiver, and the third device 850a is a receiver, referring to FIG. 8A. However, this is only one example, and as shown in FIG. 8B, the first device 830b may be a transmitter, the second device 840b may be a transceiver, and the third device 850b may be a receiver. In addition, as shown in FIG. 8C, the second device 840c may be a transmitter, the third device 840c may be a transceiver, and the first device 830c may be a receiver. In addition, as shown in FIG. 8D, the third device 850d may be a transmitter, the second device 840d may be a transceiver, and the first device 830d may be a receiver.

The flowchart of FIG. 13 shows operation S300a, and operation S300a may replace operation S300 in FIG. 7. Operations S100, S200, S400, S500, and S600 are described with reference to FIG. 7.

In operation S100, the light source 810a may generate a first optical signal OSIG_81a. The light source 810a may output the generated first optical signal OSIG_81a.

In operation S200, the first active transmitter AT8_1a may receive the first optical signal OSIG_81a from the light source 810a. The first active transmitter AT8_1a may encode the first optical signal OSIG_81a by absorbing a portion or all of the first optical signal OSIG_81a based on the first transmission value ddv1 under control by the first device 830a to output the second optical signal OSIG_82a.

In operation S310a, the first active receiver AR8_1a of the second device 840a may receive the second optical signal OSIG_82a from the first active transmitter AT8_1a.

In operation S320a, the first active receiver AR8_1a may adjust the light intensity of the second optical signal OSIG_82a to be half, and may output the internal optical signal OSIG_8ina.

In operation S330a, the second active transmitter AT8_2a may receive the internal optical signal OSIG_8ina from the first active receiver AR8_1a. The second active transmitter AT8_2a may encode the first optical signal OSIG_81a to adjust the light intensity of the third optical signal OSIG_83a by absorbing a portion or all of the internal optical signal OSIG_81ina based on the second transmission value ddv2 under control by the second device 840a.

In operation S340a, the second device 840a may output a third optical signal OSIG_83a. In greater detail, the second active transmitter AT8_2a included in the second device 840a outputs the third optical signal OSIG_83a of which light intensity is adjusted in operation S330a under control by the second device 840a.

In operation S400, the second device 840a may read data by decoding the second optical signal OSIG_82a received by the first active receiver AR8_1a. The read data may be the first transmission value ddv1.

In operation S500, the third device 850a may receive the third optical signal OSIG_83a from the second device 840a. In some embodiments, the second active receiver AR8_2a may receive the third optical signal OSIG_83a from the second active transmitter AT8_2a.

In operation S600, the third device 850a may read data by decoding the third optical signal OSIG_83a. The read data may be the second transmission value ddv2.

While the inventive concepts have been particularly shown and described with reference to some examples of embodiments thereof, it will be understood that various changes in form and details may be made therein without departing from the scope of the following claims.

What is claimed is:

1. An electronic system configured to transmit and receive internal data through an optical channel, the electronic system comprising:
    a light emitter configured to generate a first optical signal;
    a first device configured to receive the first optical signal from the light emitter, the first device including a transmitter configured to output a second optical signal representing a transmission value based on the first optical signal;
    a second device including a first receiver configured to receive the second optical signal from the first device and output a third optical signal representing the transmission value by adjusting a light intensity of the second optical signal, the second device configured to read the transmission value based on the light intensity of the second optical signal; and
    a third device including a second receiver configured to receive the third optical signal from the second device, and configured to read the transmission value based on a light intensity of the third optical signal.

2. The electronic system of claim 1, wherein the transmitter, the first receiver, and the second receiver are connected to each other through the optical channel, and are configured to transmit and receive the first optical signal, the second optical signal, or the third optical signal through the optical channel.

3. The electronic system of claim 2, wherein the transmitter, the first receiver, and the second receiver are configured to operate in any one of a first mode to absorb all light having the same wavelength as a wavelength of the first optical signal generated by the light emitter, a second mode that absorbs a portion of the light of the wavelength, and a third mode that does not absorb light of the wavelength.

4. The electronic system of claim 3,
    wherein the transmitter and the second receiver are configured to operate in the first mode, and
    the first receiver is configured to operate in the second mode.

5. The electronic system of claim 4,
    wherein the transmitter is configured to absorb all of the first optical signal when the transmission value is a first value and not to absorb the first optical signal when the transmission value is a second value, and is configured to output the second optical signal based on the light intensity of the first optical signal, and
    wherein the first receiver is configured to absorb half of the light of the second optical signal and output the third optical signal based on an absorbed light intensity of the second optical signal, and the second receiver is configured to absorb all of the light of the third optical signal.

6. The electronic system of claim 3, wherein the transmitter and the first receiver are configured to operate in the second mode, and the second receiver is configured to operate in the first mode.

7. The electronic system of claim 6,
wherein the transmitter is configured to absorb half of the first optical signal when the transmission value is a first value and not to absorb the first optical signal when the transmission value is a second value, and is configured to output the second optical signal based on an absorbed light intensity of the first optical signal, and
wherein the first receiver is configured to absorb half of the light of the second optical signal and output the third optical signal based on the absorbed light intensity of the second optical signal, and the second receiver is configured to absorb all the light of the third optical signal.

8. An electronic system that is configured to transmit and receive internal data through an optical channel, the electronic system comprising:
a light emitter configured to generate a first optical signal;
a first device configured to receive the first optical signal from the light emitter, the first device including a first transmitter configured to output a second optical signal representing a first transmission value based on the first optical signal;
a second device including a first receiver configured to receive the second optical signal from the first device and output an internal optical signal based on a light intensity of the second optical signal, the second device further comprising a second transmitter configured to receive the internal optical signal from the first receiver and output a third optical signal representing a second transmission value based on a light intensity of the internal optical signal, the second device configured to read the first transmission value based on the light intensity of the second optical signal; and
a third device including a second receiver configured to receive the third optical signal from the second device, and configured to read the second transmission value based on a light intensity of the third optical signal.

9. The electronic system of claim 8, wherein the first transmitter, the second transmitter, the first receiver, and the second receiver are connected to each other through the optical channel, and are configured to transmit and receive the first optical signal, the second optical signal, the third optical signal, or the internal optical signal through the optical channel.

10. The electronic system of claim 9, wherein the first transmitter, the second transmitter, the first receiver, and the second receiver are configured to operate in any one of a first mode in which all light having the same wavelength as a wavelength of the first optical signal generated by the light emitter is absorbed, a second mode in which half of the light of the wavelength is absorbed, and a third mode in which none of the light of the wavelength is absorbed.

11. The electronic system of claim 10,
wherein the first transmission value and the second transmission value are different from each other,
wherein the first transmitter and the first receiver are configured to operate in the second mode, and
wherein the second transmitter and the second receiver are configured to operate in the first mode.

12. The electronic system of claim 11,
wherein the first transmitter is configured to absorb half of the first optical signal when the first transmission value is a first value, is configured not to absorb the first optical signal when the first transmission value is a second value, and is configured to output the second optical signal based on the light intensity of the first optical signal,
wherein the first receiver is configured to absorb half of the light of the second optical signal and output the third optical signal based on the light intensity of the absorbed second optical signal, and
wherein the second receiver is configured to absorb all of the internal optical signals when the second transmission value is a first value and not to absorb the internal optical signals when the second transmission value is a second value, and configured to output the third optical signal based on the light intensity of the absorbed internal optical signal, and the second receiver is configured to absorb all the light of the third optical signal.

13. The electronic system of claim 10,
wherein, when the first transmission value and the second transmission value are equal to each other,
the first transmitter and the second receiver are configured to operate in the first mode, the first receiver is configured to operate in the second mode, and
the second transmitter is configured to operate in the third mode.

14. The electronic system of claim 10,
wherein, when the first transmission value and the second transmission value are different from each other,
wherein the first receiver is configured to operate in the second mode, and
wherein the first transmitter, the second transmitter, and the second receiver are configured to operate in the first mode.

15. The electronic system of claim 14,
wherein the first receiver is configured to absorb half of the light of the second optical signal,
wherein the second receiver is configured to absorb all light of the third optical signal, and
wherein the first transmitter is configured to receive the first optical signal during first to third time periods, configured not to absorb the first optical signal during the first to third time periods when the first transmission value is a third value, configured to absorb all of the first optical signal during the third time period when the first transmission value is a fourth value, configured to absorb all of the first optical signal during the second time period when the first transmission value is a fifth value, and configured to absorb all of the first optical signal during the first time period when the first transmission value is a sixth value.

16. The electronic system of claim 15,
wherein the second transmitter is configured to receive the internal optical signal during fourth to sixth time periods, configured to absorb all of the internal optical signals during the fourth to sixth time periods when the second transmission value is the third value, configured to absorb all of the internal optical signals during the fourth time period and the fifth time period when the second transmission value is the fourth value, configured to absorb all of the internal optical signals during the fourth time period and the sixth time period when the second transmission value is the fifth value, and configured to absorb all of the internal optical signals during the fifth time period and the sixth time period when the second transmission value is the sixth value.

17. A method of operating an electronic system including a first device including a first transmitter, a second device including a first receiver, and a third device including a second receiver, the first device, second device, and third device each coupled to an optical channel, the method comprising:

generating a first optical signal;

receiving the first optical signal at the first transmitter and outputting a second optical signal from the first transmitter, the second optical signal based on the first optical signal and a first transmission value;

receiving the second optical signal at the first receiver and outputting a third optical signal from the second device based on the second optical signal;

reading first data based on the second optical signal by the second device;

receiving the third optical signal at the second receiver; and reading second data based on the third optical signal by the third device.

18. The method of claim 17, wherein the first data and the second data are the same as the first transmission value.

19. The method of claim 17, wherein the second device further includes a second transmitter, and wherein the receiving of the second optical signal and outputting of the third optical signal based on the second optical signal comprises outputting, by the first receiver, an internal optical signal to the second transmitter based on the second optical signal; and adjusting, by the second transmitter, a light intensity of the third optical signal based on the internal optical signal and a second transmission value.

20. The method of claim 19, wherein the first data is the same as the first transmission value, and the second data is the same as the second transmission value.

* * * * *